US 11,811,568 B2

(12) United States Patent
Ransijn

(10) Patent No.: US 11,811,568 B2
(45) Date of Patent: *Nov. 7, 2023

(54) FRONT-END CIRCUITRY FOR A DATA RECEIVER AND RELATED SYSTEMS, METHODS, AND DEVICES

(71) Applicant: Microchip Technology Incorporated, Chandler, AZ (US)

(72) Inventor: Johannes G. Ransijn, Salem, MA (US)

(73) Assignee: Microchip Technology, Inc., Chandler, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/818,224

(22) Filed: Aug. 8, 2022

(65) Prior Publication Data

US 2022/0385504 A1 Dec. 1, 2022

Related U.S. Application Data

(63) Continuation of application No. 17/247,148, filed on Dec. 1, 2020, now Pat. No. 11,411,783.
(Continued)

(51) Int. Cl.
*H04L 25/03* (2006.01)
*H04B 3/14* (2006.01)
(Continued)

(52) U.S. Cl.
CPC ......... *H04L 25/03878* (2013.01); *H04B 1/16* (2013.01); *H04B 3/14* (2013.01);
(Continued)

(58) Field of Classification Search
CPC ......... H04L 25/03878; H04L 25/03057; H04L 27/01; H04B 3/14
See application file for complete search history.

(56) References Cited

U.S. PATENT DOCUMENTS 7,671,694 B2 3/2010 Yeung et al.
8,559,145 B1 10/2013 Kireev et al.
(Continued)

FOREIGN PATENT DOCUMENTS

EP 3363118 A1 8/2018

OTHER PUBLICATIONS

International Search Report from International Application No. PCT/US2020/070836, dated Mar. 24, 2021, 4 pages.
(Continued)

*Primary Examiner* — Dac V Ha
(74) *Attorney, Agent, or Firm* — TraskBritt

(57) ABSTRACT

Front-end circuitry for a data receiver and related systems, methods, and devices are disclosed. The front-end circuitry includes a passive equalizer, which includes a signal input, an equalizer output including a first equalizer output and a second equalizer output, a first signal path, and a second signal path. The first signal path is between the signal input and the first equalizer output. The first signal path has a first frequency response. The second signal path is between the signal input and the second equalizer output. The second signal path has a second frequency response. The second frequency response exhibits substantially inverse behavior to that of the first frequency response. An amplifier circuit is configured to combine a first equalizer output signal from the first equalizer output with a second equalizer output signal from the second equalizer output to obtain an equalized output signal.

20 Claims, 12 Drawing Sheets

Related U.S. Application Data

(60) Provisional application No. 63/027,152, filed on May 19, 2020.

(51) Int. Cl.
  *H04L 27/01* (2006.01)
  *H04B 1/16* (2006.01)
  *H04L 25/08* (2006.01)

(52) U.S. Cl.
  CPC ........ *H04L 25/03057* (2013.01); *H04L 25/08* (2013.01); *H04L 27/01* (2013.01)

(56) References Cited

U.S. PATENT DOCUMENTS

| | | |
|---|---|---|
| 9,001,900 B2 | 4/2015 | Lanoiselee et al. |
| 9,432,230 B1* | 8/2016 | Chang ...................... H04B 3/14 |
| 2008/0056344 A1 | 3/2008 | Hidaka |
| 2008/0198954 A1 | 8/2008 | Uribe et al. |
| 2012/0076191 A1 | 3/2012 | Cowley et al. |
| 2013/0201881 A1 | 8/2013 | Bauder et al. |
| 2016/0173299 A1* | 6/2016 | Islam .................. H04L 25/0296 375/232 |
| 2019/0326944 A1* | 10/2019 | Khlat ..................... H03H 7/461 |

OTHER PUBLICATIONS

International Written Opinion from International Application No. PCT/US2020/070836, dated Mar. 24, 2021, 9 pages.

\* cited by examiner

FRONT-END CIRCUITRY FOR A DATA RECEIVER AND RELATED SYSTEMS, METHODS, AND DEVICES

CROSS-REFERENCE TO RELATED APPLICATIONS

This application is a continuation of U.S. patent application Ser. No. 17/247,148, filed Dec. 1, 2020, now U.S. Pat. No. 11,411,783, issued Aug. 9, 2022, and titled FRONT-END CIRCUITRY FOR A DATA RECEIVER AND RELATED SYSTEMS, METHODS, AND DEVICES, which claims the benefit under 35 U.S.C. § 119(e) of U.S. Provisional Patent Application No. 63/027,152, filed May 19, 2020, and titled "PROGRAMMABLE DATA RECEIVER FRONT ENDS HAVING PASSIVE EQUALIZERS AND RELATED SYSTEMS, METHODS, AND DEVICES," the entire disclosure of each of which is hereby incorporated herein by reference.

TECHNICAL FIELD

This disclosure relates generally to programmable data receiver front ends, and more specifically to programmable data receivers having passive equalizers and programmable amplifier circuits.

BACKGROUND

With increasing data rates, backplane channels in serializer/deserializer (SerDes) systems present increased attenuation as compared to SerDes systems using lower data rates, leading to a need for more equalization of a received data signal to prevent inter-symbol interference and eye closure. Typical data channels may have more than twenty to thirty-five decibels (20-35 dB) of loss at the Nyquist frequency (half of baud rate). The result is a "closed eye" at the input of a receiver. As a result, there may be no way to discern a "one" from a "zero" in received signals.

One approach to implement channel equalization involves a programmable attenuator, followed by either a continuous time linear equalizer (CTLE) based on one or more stages of differential pair amplifiers with configurable resistor-capacitor (RC) degeneration, or an analog finite impulse response (aFIR) equalizer. The inventor of this disclosure appreciates that active equalizers such as CTLE, however, require up-front programmable attenuators utilizing switches, which compromise signal integrity. For example, short channels require up-front attenuation to prevent CTLE overload. Also, active equalizers have different properties at various equalizer settings, complicating design and system modeling.

BRIEF DESCRIPTION OF THE DRAWINGS

While this disclosure concludes with claims particularly pointing out and distinctly claiming specific embodiments, various features and advantages of embodiments within the scope of this disclosure may be more readily ascertained from the following description when read in conjunction with the accompanying drawings, in which:

DETAILED DESCRIPTION

Figure 1:
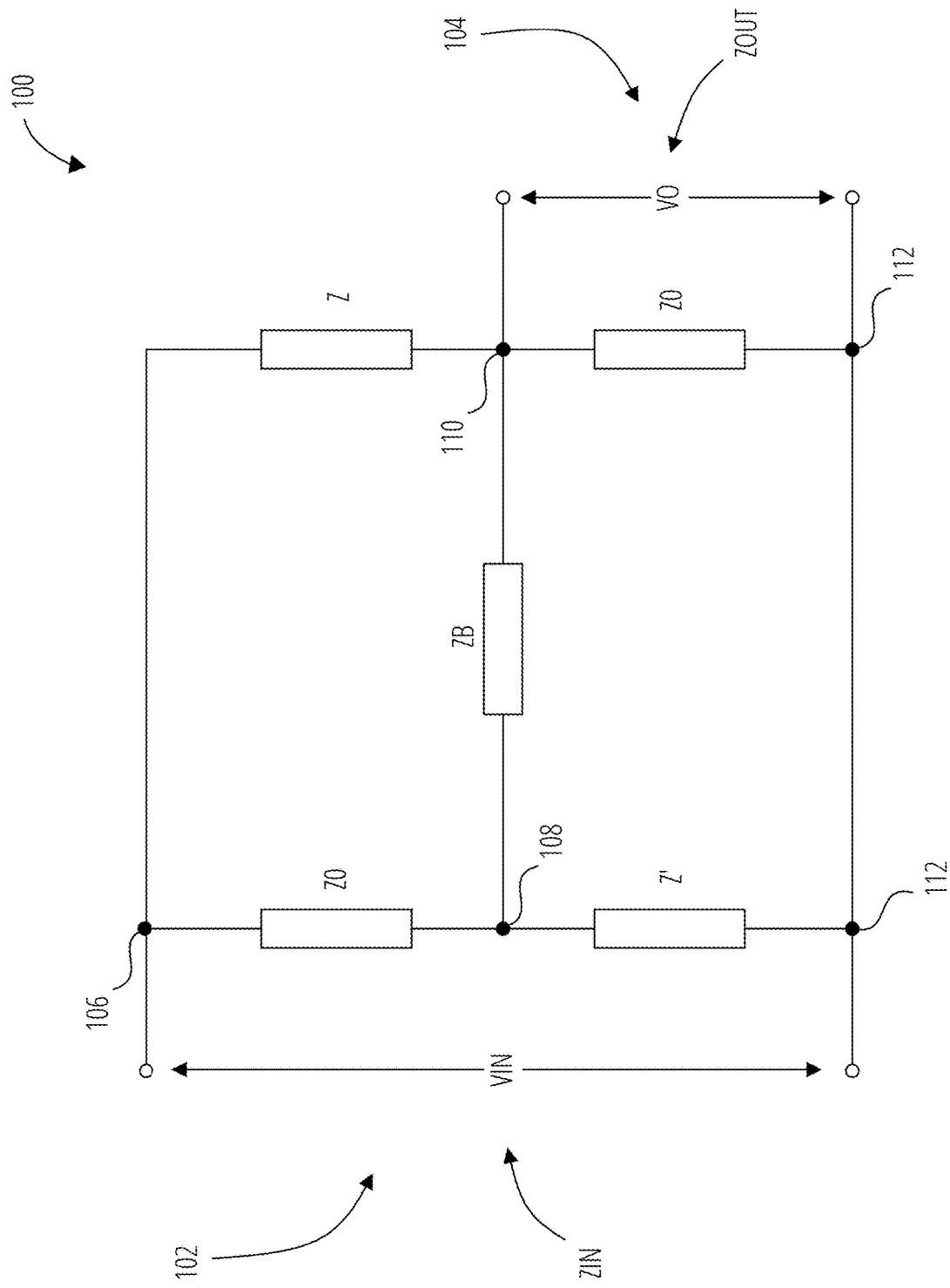
FIG. 1 is a circuit schematic illustration of a Zobel network.

In the following detailed description, reference is made to the accompanying drawings, which form a part hereof, and in which are shown, by way of illustration, specific examples of embodiments in which the present disclosure may be practiced. These embodiments are described in sufficient detail to enable a person of ordinary skill in the art to practice the present disclosure. However, other embodiments enabled herein may be utilized, and structural, material, and process changes may be made without departing from the scope of the disclosure.

The illustrations presented herein are not meant to be actual views of any particular method, system, device, or structure, but are merely idealized representations that are employed to describe the embodiments of the present disclosure. In some instances, similar structures or components in the various drawings may retain the same or similar numbering for the convenience of the reader; however, the similarity in numbering does not necessarily mean that the structures or components are identical in size, composition, configuration, or any other property.

The following description may include examples to help enable one of ordinary skill in the art to practice the disclosed embodiments. The use of the terms "exemplary," "by example," and "for example," means that the related description is explanatory, and though the scope of the disclosure is intended to encompass the examples and legal equivalents, the use of such terms is not intended to limit the scope of an embodiment or this disclosure to the specified components, steps, features, functions, or the like.

It will be readily understood that the components of the embodiments as generally described herein and illustrated in the drawings could be arranged and designed in a wide variety of different configurations. Thus, the following description of various embodiments is not intended to limit the scope of the present disclosure, but is merely representative of various embodiments. While the various aspects of the embodiments may be presented in the drawings, the drawings are not necessarily drawn to scale unless specifically indicated.

Furthermore, specific implementations shown and described are only examples and should not be construed as the only way to implement the present disclosure unless specified otherwise herein. Elements, circuits, and functions may be shown in block diagram form in order not to obscure the present disclosure in unnecessary detail. Conversely, specific implementations shown and described are exemplary only and should not be construed as the only way to implement the present disclosure unless specified otherwise herein. Additionally, block definitions and partitioning of logic between various blocks is exemplary of a specific implementation. It will be readily apparent to one of ordinary skill in the art that the present disclosure may be practiced by numerous other partitioning solutions. For the most part, details concerning timing considerations and the like have been omitted where such details are not necessary to obtain a complete understanding of the present disclosure and are within the abilities of persons of ordinary skill in the relevant art.

Those of ordinary skill in the art will understand that information and signals may be represented using any of a variety of different technologies and techniques. Some drawings may illustrate signals as a single signal for clarity of presentation and description. It will be understood by a person of ordinary skill in the art that the signal may represent a bus of signals, wherein the bus may have a variety of bit widths and the present disclosure may be implemented on any number of data signals including a single data signal.

The various illustrative logical blocks, modules, and circuits described in connection with the embodiments disclosed herein may be implemented or performed with a general purpose processor, a special purpose processor, a digital signal processor (DSP), an Integrated Circuit (IC), an Application Specific Integrated Circuit (ASIC), a Field Programmable Gate Array (FPGA) or other programmable logic device, discrete gate or transistor logic, discrete hardware components, or any combination thereof designed to perform the functions described herein. A general-purpose processor (may also be referred to herein as a host processor or simply a host) may be a microprocessor, but in the alternative, the processor may be any conventional processor, controller, microcontroller, or state machine. A processor may also be implemented as a combination of computing devices, such as a combination of a DSP and a microprocessor, a plurality of microprocessors, one or more microprocessors in conjunction with a DSP core, or any other such configuration. A general-purpose computer including a processor is considered a special-purpose computer while the general-purpose computer is configured to execute computing instructions (e.g., software code, without limitation) related to embodiments of the present disclosure.

The embodiments may be described in terms of a process that is depicted as a flowchart, a flow diagram, a structure diagram, or a block diagram. Although a flowchart may describe operational acts as a sequential process, many of these acts can be performed in another sequence, in parallel, or substantially concurrently. In addition, the order of the acts may be re-arranged. A process may correspond to a method, a thread, a function, a procedure, a subroutine, a subprogram, other structure, or combinations thereof. Furthermore, the methods disclosed herein may be implemented in hardware, software, or both. If implemented in software, the functions may be stored or transmitted as one or more instructions or code on computer-readable media. Computer-readable media includes both computer storage media and communication media including any medium that facilitates transfer of a computer program from one place to another.

Any reference to an element herein using a designation such as "first," "second," and so forth does not limit the quantity or order of those elements, unless such limitation is explicitly stated. Rather, these designations may be used herein as a convenient method of distinguishing between two or more elements or instances of an element. Thus, a reference to first and second elements does not mean that only two elements may be employed there or that the first element must precede the second element in some manner. In addition, unless stated otherwise, a set of elements may include one or more elements.

As used herein, the term "substantially" in reference to a given parameter, property, or condition means and includes to a degree that one of ordinary skill in the art would understand that the given parameter, property, or condition is met with a small degree of variance, such as, for example, within acceptable manufacturing tolerances. By way of example, depending on the particular parameter, property, or condition that is substantially met, the parameter, property, or condition may be at least 90% met, at least 95% met, or even at least 99% met.

Receiver front-ends may be used to handle high transmit launch amplitudes, which may be greater than one volt differential peak to peak (1 Vppd). Given transmit signals in excess of one volt (1 Vppd), it is difficult for active equalizers implemented in low-voltage technologies having operational ranges lower than these amplitudes to handle the dynamic peak-to-peak voltage potential range while determining the outer envelope of the received data eye. A receiver front-end, which may include a passive attenuator or equalizer, may be used to attenuate a data eye envelope. It is desirable for such a passive attenuator or equalizer to accommodate multiple channels, however, making such a passive attenuator or equalizer programmable in order to accommodate multiple channels is challenging at frequencies beyond ten gigahertz (10 GHz). Beyond 10 GHz signal integrity is easily compromised if passive front-end circuitry is made to be reconfigurable. For example, channel loss (e.g., attenuation in conductive traces delivering signals to a receiver front-end, without limitation) is low at low frequencies (e.g., typically lower than 100 MHz in serial communication, without limitation), but increases as frequency increases (e.g., substantially proportionally with frequency). A SerDes receiver front-end should preferably compensate for increasing channel losses as frequency increases, which channel losses may be greater than twenty to thirty-five decibels (20-35 dB) at the Nyquist rate, so that the receiver front-end (e.g., passive attenuator or equalizer) in combination with the channel has an overall frequency response that is largely constant with frequency. For a typical SerDes receiver known to the inventor of this disclosure, a data eye envelope provided by the receiver front-end may not be greater than about 400 mVppd. Larger envelopes may push receiver circuitry into a non-linear region (e.g., saturate, clip, without limitation), which may lead to distortion.

Disclosed herein is a front-end circuitry having a passive equalizer and a programmable amplifier circuit. Front-end circuitry disclosed herein may find particular application in a high-speed (e.g., a channel frequency of substantially 10 GHz or greater) data receiver (e.g., a SerDes, without limitation). The passive equalizer may include a fixed Zobel constant-resistance bridge (sometimes referred to herein as a "Zobel network"). An impedance compensating arm of the fixed Zobel constant-resistance bridge, which is normally unused in most applications, is used as a secondary signal path in addition to a primary signal path of the fixed Zobel constant-resistance bridge. The secondary signal path exhibits a complementary frequency response with respect to the primary signal path. By combining the signals from the primary signal path and the secondary signal path in the programmable amplifier circuit, which may comprise a programmable two-input summing amplifier, a flat and fully equalized frequency response can be obtained. Both inputs of the programmable two-input summing amplifier receive signals having a data envelope attenuated by a fixed amount of low-frequency de-emphasis of the fixed Zobel constant-resistance bridge, and are thus protected from excess input voltage potential levels. At the same time, as both signal paths of the fixed Zobel constant resistance bridge are properly terminated by the programmable two-input summing amplifier and as the fixed Zobel constant resistance bridge itself is fixed, the input return loss and signal integrity of the receive path are assured.

In some embodiments the passive equalizer includes a fixed dual-path passive equalizer based on a fixed Zobel constant-resistance bridge and the programmable amplifier circuit includes a programmable-gain summing amplifier that linearly combines two outputs from the fixed Zobel constant-resistance bridge. The fixed Zobel constant-resistance bridge includes two signal paths. A first signal path of the fixed Zobel constant-resistance bridge represents an equalizing response. A second signal path of the fixed Zobel constant-resistance bridge represents a complement of the equalizing response of the first signal path. Input impedances of the first signal path and the second signal path are complementary. In other words, together, the first signal path and the second signal path represent a substantially constant resistance regardless of a frequency of an input signal applied thereto because reactive components of impedances of the first signal path and the second signal path cancel each other out. This ensures an appropriate high-speed termination of a high-speed data receiver.

In general, the first signal path and the second signal path are implemented by creating two parallel impedances. The first signal path may be formed by a series combination of a first termination resistor having an impedance Zo (e.g., 50 ohms, without limitation) and a frequency-dependent impedance Z. The second signal path may be formed by a series combination of a second termination resistor having impedance Zo and an impedance Z' set to Z'(Zo^2)/Z. When the fixed Zobel constant-resistance bridge is implemented as a balanced bridge, the sensitivity to downstream terminations is reduced because the output impedance is equal to the input impedance and thus secondary reflections are greatly reduced.

In contrast to the use of a programmable attenuator in front of an active equalizer (e.g., a CTLE, without limitation) to bring the data envelope within the linear input range of the equalizer, embodiments disclosed herein include a passive equalizer with an amount of de-emphasis (peaking) based on the longest channel (e.g., longest-length conductive trace delivering input signals to the passive equalizer, without limitation) that is used in the system. The sum of de-emphasis and equivalent decision feedback equalizer (DFE) equalization equals the Nyquist channel loss, i.e., the absorption loss at the Nyquist frequency experienced by a signal transmitted along the communication channel. Accordingly, the data envelope entering the programmable amplifier circuit (the active part of the receiver front-end), is brought down to below its linearity limits while the attenuation at the Nyquist frequency remains minimal. No switches are needed inside the passive equalizer. Rather, the effective amount of de-emphasis is determined by the programmable amplifier circuit. It is much easier to implement a programmable amplifier circuit than a programmable passive attenuator or equalizer.

In some embodiments several (e.g., on the order of $10^2$ or $10^3$, such as forty, without limitation) amplifier slices (e.g., each including a differential pair amplifier, without limitation) may be built for each path of the fixed Zobel constant-resistance bridge. Gain adjustment is achieved by selectively turning slices on or off. As the input capacitance of an amplifier slice is largely constant, broadband matching is achieved, independent of equalizer settings.

Front-end circuitry disclosed herein counters frequency-dependent losses of physical channels between computer servers, boards, and/or chips that run serial data at high speeds (e.g., ten gigabytes per second, without limitation). The increasing loss with increasing frequency of the channel is compensated for by increasing gain of the programmable amplifier with frequency, resulting in a "flat" response and an "open eye." Also, front-end circuitry disclosed herein overcome the often conflicting requirements of linearity, signal integrity, and programmability by using a two-path passive equalizer (linearity) up front with complementary responses, and a programmable amplifier circuit that combines both responses, preferably in a linear fashion.

Embodiments disclosed herein reduce large transmit signal envelopes going into active devices to alleviate linearity requirements by using a passive equalizer front-end. Embodiments disclosed herein decouple a programmability need of a passive equalizer and/or attenuator from termination requirements by using a fixed, constant-resistance equalizer with dual outputs. Embodiments disclosed herein also separate an equalizer function from a gain function. Each (equalizer and gain) may be optimized and modeled without compromise to the other. A summing circuit, preferably implemented with a linear summing amplifier, has a flat, wideband response, which lends itself to modeling by design tools.

FIG. 1 is a circuit schematic illustration of a Zobel network 100. The Zobel network 100 includes an impedance Z, an impedance Z', a bridge impedance ZB, and a pair of reference impedances Z0. The impedance Z' is substantially equal to a dual impedance of the impedance Z with respect to the reference impedance Z0: $Z'=Z0^2/Z$. Moreover, the reactive portions of the dual impedance Z' cancel out the reactive portions of the impedance Z. The reference impedances are substantially equal to each other (Z0=Z0). The Zobel network 100 also includes an input 102 across a first node 106 and a fourth node 112, and an output 104 across a third node 110 and the fourth node 112. A first one of the reference impedances Z0 and the dual impedance Z' are electrically connected in series across the input 102. In other words, the first reference impedance Z0 is electrically connected from the first node 106 to a second node 108 and the dual impedance Z' is electrically connected from the second node 108 to the fourth node 112. A second one of the reference impedances Z0 is electrically connected across the output 104. In other words, the second one of the reference impedances Z0 is electrically connected from the third node 110 to the fourth node 112. The impedance Z is electrically connected from the first node 106 and third node 110, and thus the impedance Z and the second one of the reference impedances Z0 are thus electrically connected in series across the input 102. A bridge impedance ZB is electrically connected from between the first one of the reference impedances Z0 and the dual impedance Z', i.e., from the second node 108, to between the impedance Z and the second one of the reference impedances Z0. In other words, the bridge impedance ZB is electrically connected from the second node 108 to the third node 110.

An input impedance looking into the input 102 of the Zobel network 100 is represented by ZIN. An output impedance looking into the output 104 of the Zobel network 100 is represented by ZOUT. Values of Z, Z' and Z0 may be selected so that the Zobel network 100 is balanced (a "balanced Zobel network"). As used herein, the terms "balanced" and "balancing," when referring to an impedance network, refer to a condition where an input impedance looking into the input of the impedance network is substantially equal to an output impedance looking into the output of the impedance network. In the case of the Zobel network 100 of FIG. 1, the Zobel network 100 is balanced when the input impedance ZIN is substantially equal to the output impedance ZOUT. In particular, the Zobel network 100 is balanced if the following relationship is substantially satisfied:

$$\frac{Z}{Z0} = \frac{Z0}{Z'}.$$

The inverse of the input impedance ZIN (i.e., the input admittance) of the Zobel network 100 is given by:

$$\frac{1}{ZIN} = \frac{1}{Z0+Z'} + \frac{1}{Z+Z0}.$$

The dual impedance Z' may be given by:

$$Z' = \frac{Z0^2}{Z}.$$

When the Zobel network 100 is balanced the input impedance ZIN of the Zobel network 100 may be substantially equal to the reference impedance Z0. If the reference impedance Z0 is selected to include substantially only resistive components (substantially excluding reactive components), the input impedance ZIN is substantially resistive.

The dual impedance Z' may be selected to be dual to impedance Z. As used herein, the term "dual," when referring to a first impedance and a second impedance indicates that the second impedance is substantially the square of a reference impedance divided by the first impedance (e.g., the balance condition, or $$Z' = \frac{Z0^2}{Z},$$

without limitation). In the case of impedance Z and dual impedance Z', Z and Z' may be selected to be dual if Z' is substantially equal to Z0²/Z. If Z and Z' are duals, the Zobel network 100 is balanced and the input impedance ZIN of the Zobel network 100 is substantially equal to the reference impedance Z0. The impedance Z and the dual impedance Z' may be first, second, or any order impedance networks. The bridge impedance ZB may optionally be selected to be substantially equal to the reference impedance Z0. In such instances the Zobel network 100 may be symmetrical.

As used herein, the term "complementary," when referring to a first frequency response and a second frequency response, indicates that the second frequency response shows substantially inverse behavior to the first frequency response over a frequency range of interest (e.g., 100 MHz to 100 GHz, without limitation). For example, where the first frequency response is characteristic of a band-pass filter with a specific pass band, the second frequency response will be characteristic of a band-stop filter with a specific stop band that is substantially the same as the specific pass band of the first frequency response. Also, at frequencies where the first frequency response has peaks, the second frequency response has valleys. "Complementary" does not necessarily imply that the second frequency response manifests perfect inverse behavior to the first frequency response. Rather, "complementary" indicates that adding the second frequency response to the first frequency response produces an aggregate frequency response that is flatter than the first frequency response alone.

Figure 2:
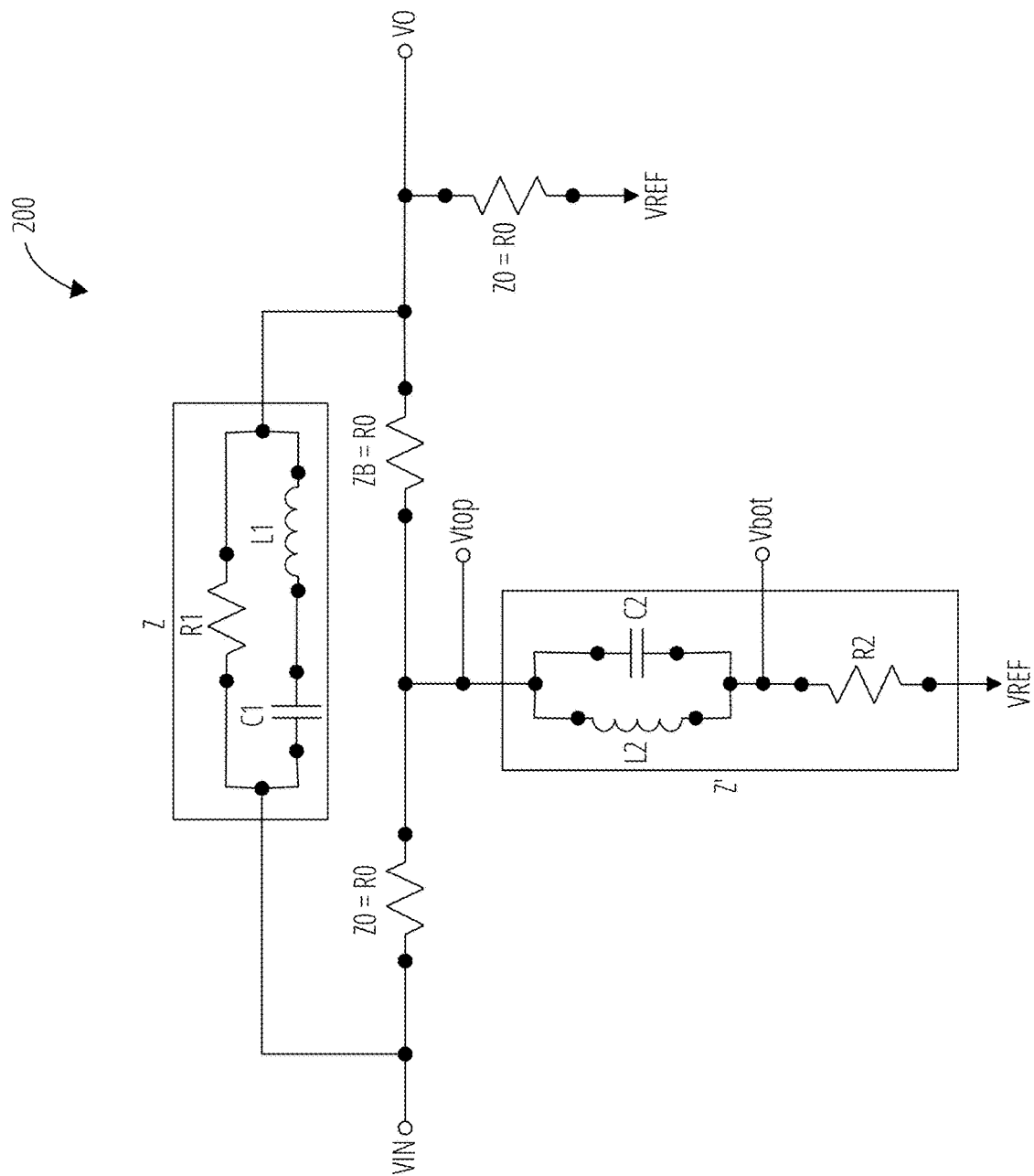
FIG. 2 is a circuit schematic illustration of a second order Zobel network.

FIG. 2 is a circuit schematic illustration of a second order Zobel network 200. The second order Zobel network 200 is an example of the Zobel network 100 of FIG. 1. For example, the second order Zobel network 200 includes an impedance Z, a dual impedance Z', reference impedances Z0, and a bridge impedance ZB. In the second order Zobel network 200 the impedance Z and the dual impedance Z' are second order impedance networks. For example, in the second order Zobel network 200 of FIG. 2 the impedance Z includes a first resistor R1 in parallel with a series combination of a capacitor C1 and an inductor L1, and the dual impedance Z' includes a parallel combination of a capacitor C2 and an inductor L2 in series with a second resistor R2. The reference impedances and the bridge impedance of the second order Zobel network 200 are each a reference resistance R0. Since the bridge impedance ZB is equal to the reference impedances Z0 the second order Zobel network 200 of FIG. 2 is symmetrical.

The dual impedance Z' of FIG. 2 is dual to the impedance Z with respect to reference impedance Z0. In other words, $$Z' = \frac{Z0^2}{Z}.$$

Accordingly, the second order Zobel network 200 of FIG. 2 is balanced. To accomplish this condition, a value of the first resistor may be R1=N*R0 (where "*" is the multiplication operator) and a value of the second resistor may be R2=R0/N (satisfying the balancing condition), where N is a positive real number. In this example, the balance condition requires that the following be substantially realized:

$$L2 = Z0^2 * C1, \text{ and}$$

$$C2 = \frac{L1}{Z0^2}.$$

A transfer function of the second order Zobel network 200 following these conditions is given by:

$$\frac{VO}{VIN} = \frac{1}{1+N} \cdot \frac{s^2 + s\frac{\omega_0}{Q_z} + \omega_0^2}{s^2 + s\frac{\omega_0}{Q_p} + \omega_0^2},$$

where $\omega_0$ is $2\pi f_0$, $f_0$ is the resonance frequency of the second order Zobel network 200 (given by $$\omega_0^2 = \frac{1}{L1C1} = \frac{1}{L2C2}\bigg),$$

$\omega$ is $2\pi f$, f is the frequency of the input voltage potential VIN, s is $j\omega$, $$j = \sqrt{-1},\ Q_p = Q\frac{N+1}{N},\ Q_z = \frac{Q}{N},\ Q = \omega_0 R0C2,$$

and N is a positive real number. Input voltage potential VIN and output voltage potential VO are each defined in relation to reference voltage potential VREF. A constant input resistance and balance of the second order Zobel network 200 may be designed for as long as the condition $$N = \frac{R1}{R0} = \frac{R0}{R2}$$

is satisfied.

A top voltage potential VTOP and a bottom voltage potential VBOT may be taken above the parallel combination of L2 and C2 and below the parallel combination of L2 and C2, respectively, relative to the reference voltage potential VREF (e.g., ground or other specified voltage, without limitation). It is noted that due to the aforementioned balance condition being met, the VTOP voltage potential is substantially equal to the output voltage potential VO. A frequency response of the bottom voltage potential VBOT may be substantially complementary to a frequency response of the top voltage potential VTOP. One way to ensure that the frequency response of the bottom voltage potential VBOT is substantially complementary, or inverse, to the frequency response of the top voltage potential VTOP is to set Z and Z' to be duals. In other words, a transfer function HTOP=VTOP/VIN of the top voltage potential VTOP relative to the input voltage potential VIN may have peaks at substantially the same frequencies where a transfer function HBOT=VBOT/VIN of the bottom voltage potential VBOT relative to the input voltage potential VIN has valleys. Also, HTOP may have valleys at frequencies where HBOT has peaks. It can be shown that the transfer functions HTOP and HBOT, as functions of the complex frequency s are complementary when HBOT is weighted by N: HTOP(s)+N*HBOT(s)=1. For the second order Zobel network 200 of FIG. 2, the transfer functions HTOP and HBOT are given by:

$$HTOP = \frac{1}{1+N} \cdot \frac{s^2 + s\frac{\omega_0}{Q_z} + \omega_0^2}{s^2 + s\frac{\omega_0}{Q_p} + \omega_0^2},\text{ and}$$

-continued
$$HBOT = \frac{1}{1+N} \cdot \frac{s^2 + \omega_0^2}{s^2 + s\frac{\omega_0}{Q_p} + \omega_0^2}.$$

Figure 3:
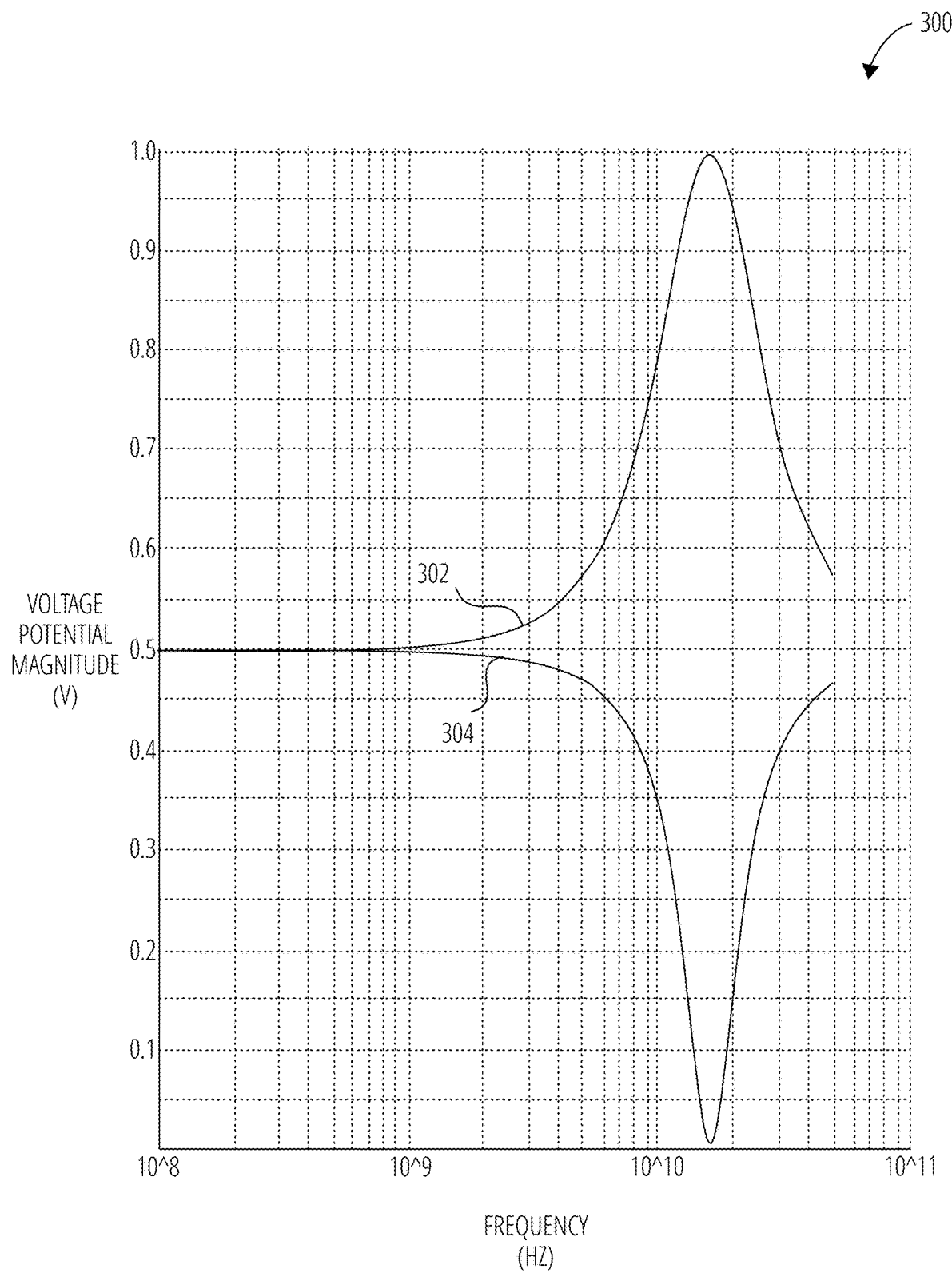
FIG. 3 is a plot illustrating a frequency response of a top voltage potential VTOP and a bottom voltage potential VBOT of the second order Zobel network of FIG. 2 responsive to an input signal.

FIG. 3 is a plot 300 illustrating a frequency response of a top voltage potential VTOP and a bottom voltage potential VBOT of the second order Zobel network 200 of FIG. 2 responsive to an input voltage signal VIN (FIG. 2) with the value of N set to one (N=1). The plot 300 includes a top voltage potential VTOP plot 302 and a bottom voltage potential VBOT plot 304 corresponding to the top voltage potential VTOP and the bottom voltage potential VBOT, respectively of FIG. 2, plotted against frequency (in Hertz). The top voltage potential VTOP plot 302 and the bottom voltage potential VBOT plot 304 are plotted in units of voltage potential magnitude, or in other words, Volts (V). As can be seen in the plot 300, the bottom voltage potential VBOT plot 304 shows a substantially inverse frequency response to that of the top voltage potential VTOP plot 302. It is noted that although the weighted vector sum of HTOP (s) and N*HBOT(s) equal unity, this is not necessarily the case for the magnitudes |HTOP(s)| and |HBOT(s)|. Consequently, the two curves |HTOP| and |HBOT|, which correspond to the top voltage potential VTOP plot 302 and the bottom voltage potential VBOT plot 304, respectively, do not add up to one, whereas |HTOP+HBOT| does equal one.

Since the bottom voltage potential VBOT plot 304 has a substantially inverse frequency response to that of the top voltage potential VTOP plot 302, a linear combination of the top voltage potential VTOP plot 302 and the bottom voltage potential VBOT plot 304 would amount to a substantially flat frequency response for the passive equalizer. Accordingly, embodiments of the present disclosure leverage a passive equalizer including complementary signal paths along with a programmable amplifier circuit, which is programmed to counter the channel's dependence on frequency, to provide substantially flat frequency responses for the combination of the channel and the receiver front-end.

Figure 4:
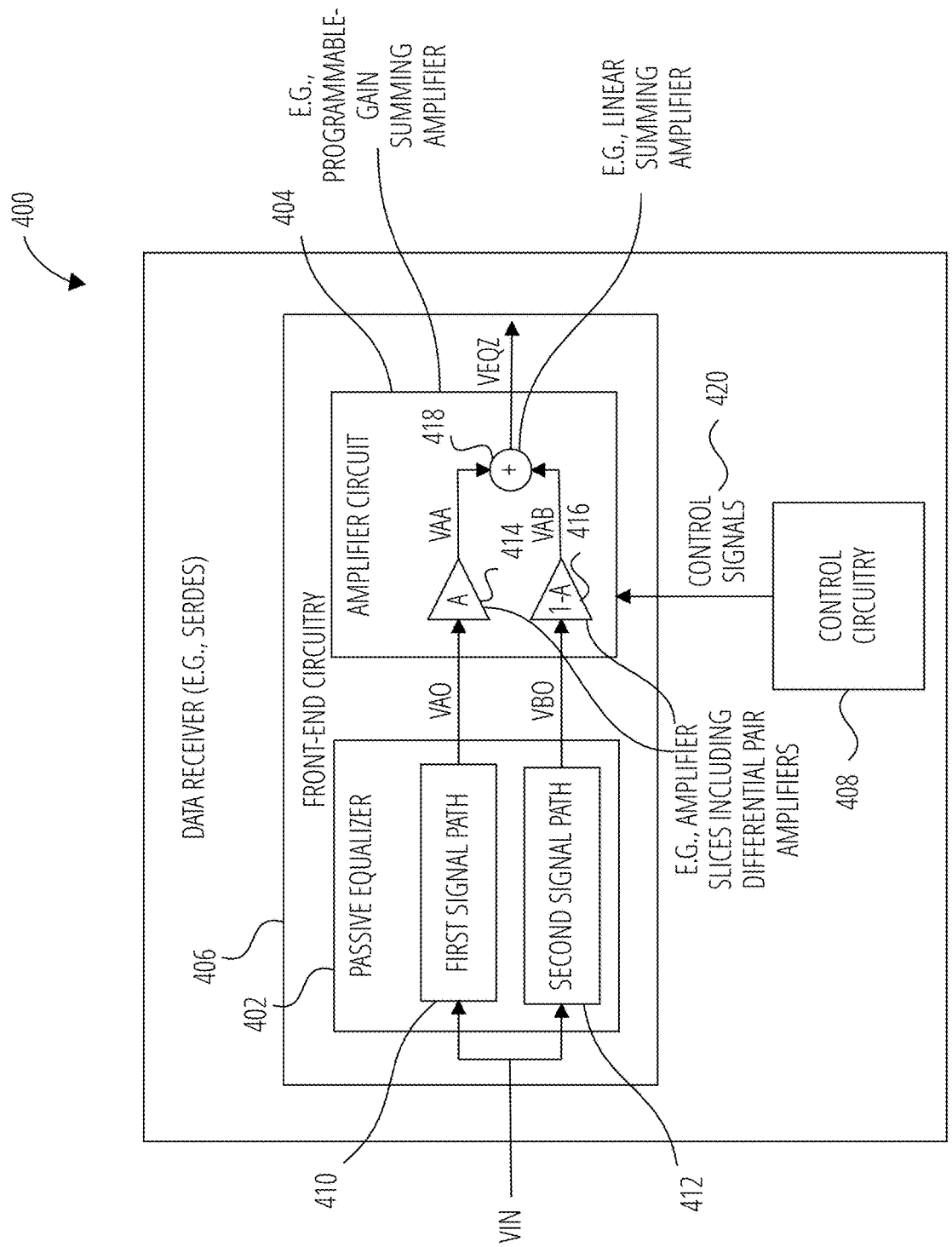
FIG. 4 is a block diagram of a data receiver, according to some embodiments.

FIG. 4 is a block diagram of a data receiver 400, according to some embodiments. The data receiver 400 includes front-end circuitry 406 configured to leverage a passive equalizer 402 including complementary signal paths (first signal path 410 and second signal path 412) along with an amplifier circuit 404 configured to sum signals, preferably linearly, (first equalizer output signal VAO and second equalizer output signal VBO) from the first signal path 410 and the second signal path 412 to provide a substantially flat frequency response of an equalized output signal VEQZ responsive to an input signal VIN.

As previously mentioned, the first signal path 410 and the second signal path 412 are complementary. Accordingly, an impedance of the second signal path 412 is dual to an impedance of the first signal path 410. As a result, a frequency response of the second equalizer output signal VBO is substantially inverse to a frequency response of the first equalizer output signal VAO, responsive to the input signal VIN. By way of non-limiting example, a frequency response of the first signal path 410 may have a peak at the Nyquist frequency, and a frequency response of the second signal path 412 may have a notch at the Nyquist frequency. The passive equalizer 402 may compensate for a large signal envelope of the input signal VIN by reducing signal envelopes of the first equalizer output signal VAO and the second equalizer output signal VBO to be within a linear input range of the amplifier circuit 404 using passive circuitry without programmability of the passive equalizer 402. More detailed examples of passive equalizers are discussed below with reference to FIG. 5 and FIG. 6.

The amplifier circuit 404 includes a first amplifier 414, a second amplifier 416, and a summing circuit 418. The first amplifier 414 and the second amplifier 416 are configured to receive the first equalizer output signal VAO and the second equalizer output signal VAO, respectively. The first amplifier 414 is configured to amplify the first equalizer output signal VAO by a gain A to generate a first amplified signal VAA. The second amplifier 416 is configured to amplify the second equalizer output signal VBO by a gain 1-A (one minus the gain of the first amplifier 414) to generate a second amplified signal VAB. It should be noted that the gain of the second amplifier 416 may be selected to be different from 1-A, and may even be independent from A. By using a gain of the second amplifier 416 that is a function of the gain A of the first amplifier 414, however, only a single variable A is introduced to determine the gains of both the first amplifier 414 and the second amplifier 416. The summing circuit 418 is configured to sum the first amplified signal VAA and the second amplified signal VAB to generate an equalized signal VEQZ. Accordingly, the amplifier circuit 404 is configured to combine the responses of the first signal path 410 and the second signal path 412. More detail regarding an example of the amplifier circuit 404 is discussed below with reference to FIG. 7.

The amplifier circuit 404 is a programmable amplifier circuit. The data receiver 400 also includes control circuitry 408 configured to provide control signals 420 to control the gains of the first amplifier 414 and the second amplifier 416, which may be programmable-gain amplifiers. By way of non-limiting example, the control signals 420 may be configured to control the value of A of the first amplifier 414 and the second amplifier 416.

The configuration of front-end circuitry 406 separates an equalizing function (performed by the passive equalizer 402) from a gain function (performed by the amplifier circuit 404). As a result, the passive equalizer 402 and the amplifier circuit 404 may be optimized individually without compromise to the other.

Figure 5:
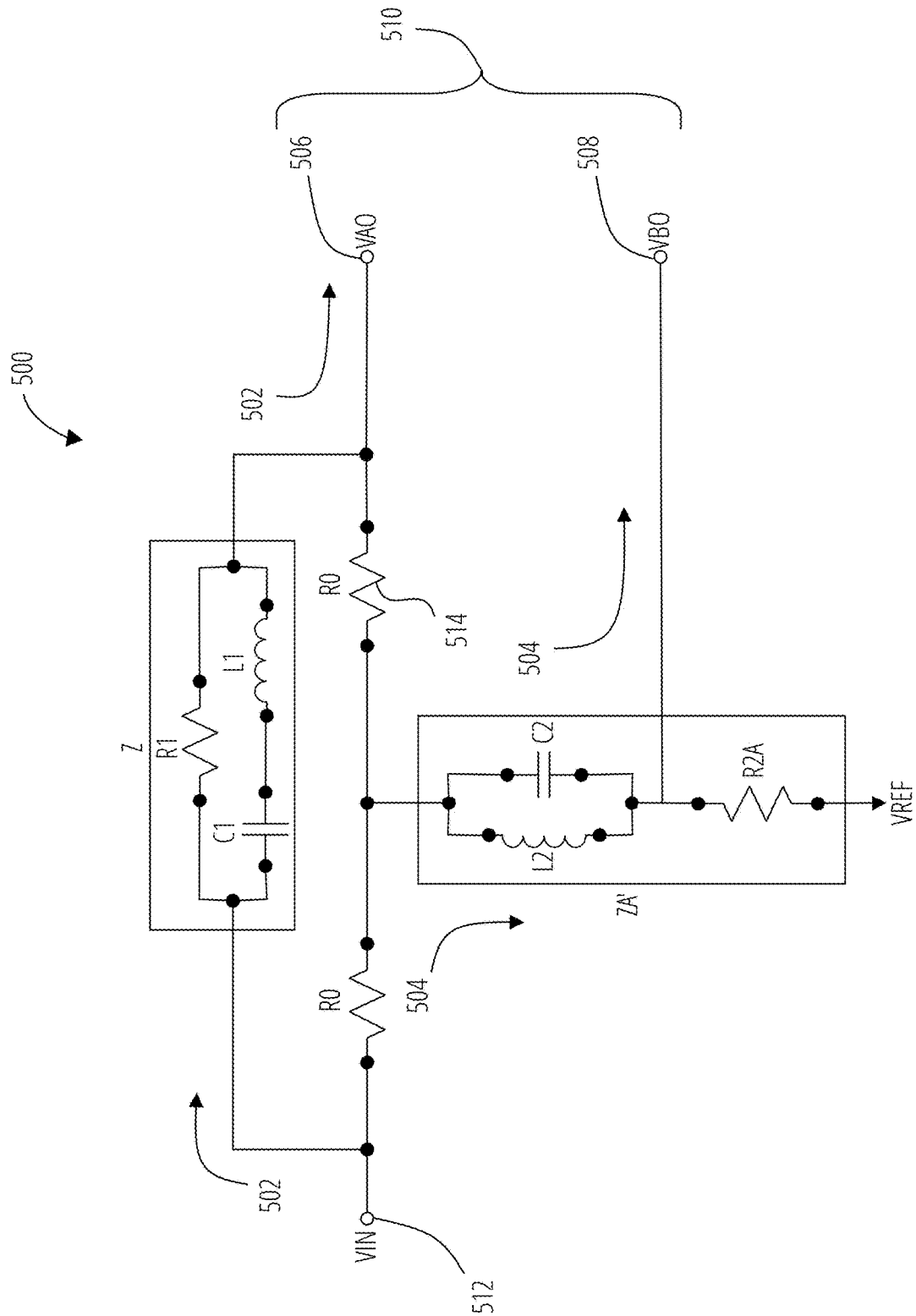
FIG. 5 is a circuit schematic illustration of a passive equalizer, which may be used in the data receiver of FIG. 4, according to some embodiments.

FIG. 5 is a circuit schematic illustration of a passive equalizer 500, which may be used as the passive equalizer 402 of the data receiver 400 of FIG. 4, according to some embodiments. The passive equalizer 500 includes a signal input 512 (e.g., a conductive pin, connector, trace, or wire, without limitation) and an equalizer output 510. The equalizer output 510 includes a first equalizer output 506 and a second equalizer output 508 (e.g., conductive pins, connectors, traces, or wires, without limitation). The passive equalizer 500 also includes a first signal path 502 between the signal input 512 and the first equalizer output 506. The passive equalizer 500 further includes a second signal path 504 between the signal input 512 and the second equalizer output 508.

The passive equalizer 500 has some similarities to the second order Zobel network 200 of FIG. 2. For example, an impedance of the first signal path 502 Z is dual to an impedance ZA' of the second signal path 504. Also by way of example, the passive equalizer 500 includes impedance Z and dual impedance ZA' similar to the impedance Z and dual impedance Z' of FIG. 2. Similar to the impedance Z and the dual impedance Z' of FIG. 2, the impedance Z and the dual impedance ZA' are second order impedance networks. It should be noted, however, that the impedance Z and the dual impedance ZA' may instead be implemented as first, third, fourth, or any other order impedance networks without exceeding the scope of this disclosure. Also, the impedance Z of FIG. 5 includes the first resistor R1 in parallel with the series combination of the capacitor C1 and the inductor L1, and the dual impedance ZA' includes the parallel combination of the capacitor C2 and the inductor L2 in series with a second resistor R2A. Similar to the first resistor R1 of FIG. 2, a value of the first resistor R1 of FIG. 5 may be a reference resistance R0 multiplied by N (R1=R0*N). A value of the second resistor R2A of FIG. 5, however, is the reference resistance R0 divided by N−1

$$\left(R2A = \frac{R0}{N-1}\right),$$

in contrast to the value of the second resistor R2 of FIG. 2, which is R2=R0/N. Another difference between the passive equalizer 500 and the second order Zobel network 200 of FIG. 2 is that the passive equalizer 500 does not include a reference resistance R0 between the first equalizer output 506 and a reference voltage potential VREF, though an input impedance of an amplifier circuit (e.g., the amplifier circuit 404 of FIG. 4, without limitation) may be set substantially equal to R0 to cause the passive equalizer 500 to operate similar to the second order Zobel network 200 of FIG. 2. The selection of a value of N, and by extension the values of R1 and R2A, may be made based, at least in part, on a length of a physical channel (e.g., a conductive trace in an integrated circuit chip including the passive equalizer 500, without limitation) delivering the input signal VIN to the signal input 512, as will be discussed with reference to FIG. 8 and FIG. 9.

These differences between the passive equalizer 500 and the second order Zobel network 200 of FIG. 2 may compensate for input impedances equal to the reference resistance R0 looking into inputs of a first amplifier electrically connected to the first equalizer output 506 and a second amplifier electrically connected to the second equalizer output 508 (e.g., the first amplifier 414 and the second amplifier 416 of FIG. 4, without limitation). Assuming that amplifiers having R0 as their input impedances are electrically connected to the first equalizer output 506 and the second equalizer output 508, the passive equalizer 500 is equivalent to the second order Zobel network 200 of FIG. 2. In such instances the passive equalizer 500 is balanced.

The passive equalizer 500 includes a reference resistance R0 between the signal input 512 and the dual impedance ZA' similar to the second order Zobel network 200 of FIG. 2. The passive equalizer 500 also includes a bridge impedance 514 bridging the first signal path 502 to the second signal path 504. The bridge impedance 514 is set to have an impedance equal to the reference resistance R0, similar to the bridge impedance ZB of the second order Zobel network 200 of FIG. 2.

In operation an input signal VIN is provided to the passive equalizer 500, and is applied to the first signal path 502 and the second signal path 504. In response, the first signal path 502 provides a first equalizer output signal VAO to the first equalizer output 506 and the second signal path 504 provides a second equalizer output signal VAB to the second equalizer output 508. The second equalizer output signal VBO manifests a substantially inverse frequency response to that of the first equalizer input signal VAO.

The passive equalizer 500 attenuates an envelope of the first equalizer output signal VAO and the second equalizer output signal VBO as compared to that of the input signal VIN. The passive equalizer 500 also provides termination (e.g., appropriate frequency response, without limitation) to the input signal VIN to reduce return loss.

It is noted that values of the first resistor R1 and the second resistor R2A are fixed. As a result, the passive equalizer 500 is implemented without variable resistors, which may simplify the design, implementation, and operation of the passive equalizer 500 as compared to equalizer circuits that use variable resistors (e.g., electrically controllable potentiometers, which may include switching elements in integrated circuit implementations, without limitation).

Figure 6:
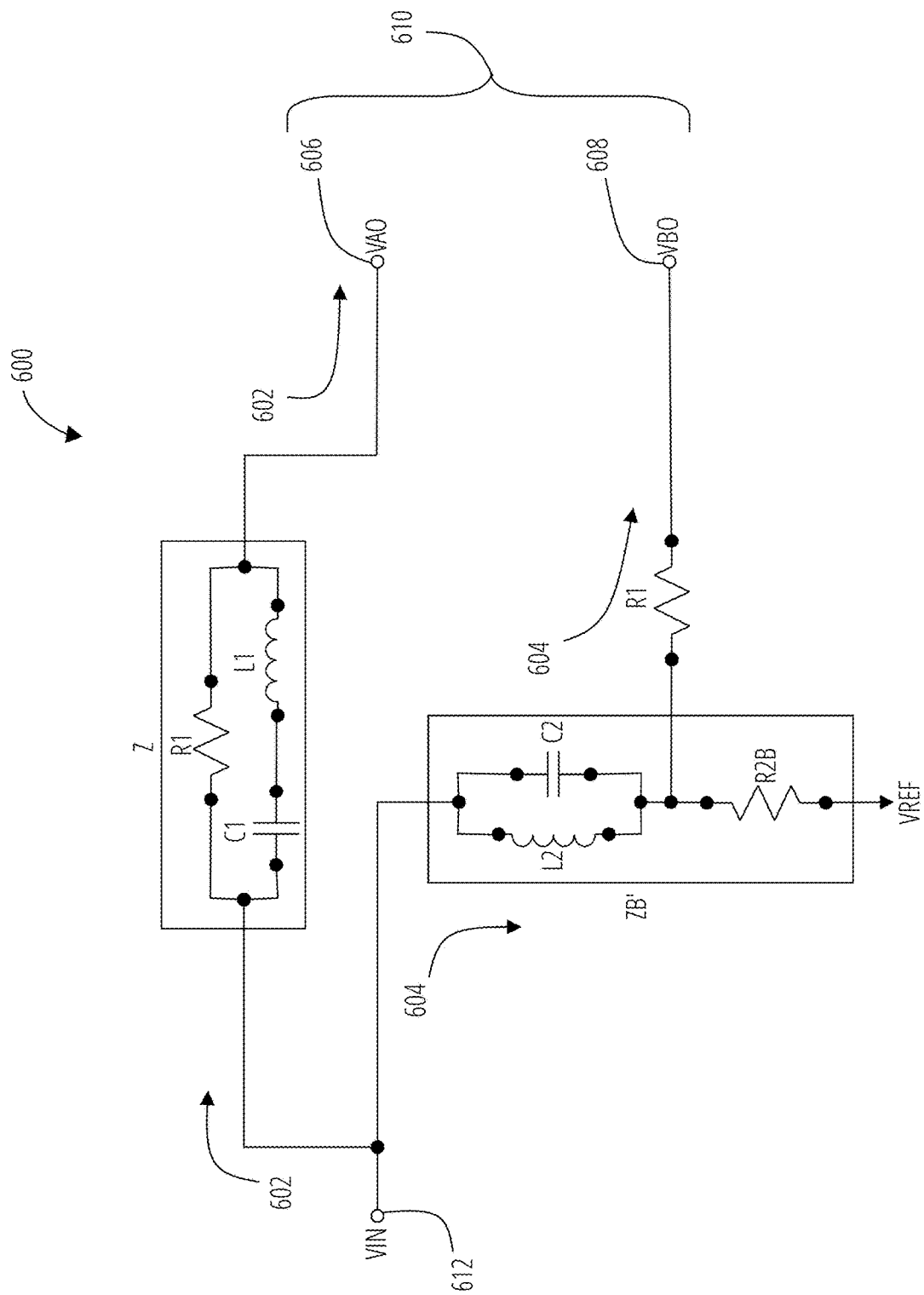
FIG. 6 is a circuit schematic illustration of an alternative passive equalizer, which may be used in the data receiver of FIG. 4, according to some embodiments.

FIG. 6 is a circuit schematic illustration of an alternative passive equalizer 600, which may be used as the passive equalizer 402 of the data receiver 400 of FIG. 4, according to some embodiments. The alternative passive equalizer 600 includes a signal input 612 and an equalizer output 610, which includes a first equalizer output 606 and a second equalizer output 608. The signal input 612, the equalizer output 610, the first equalizer output 606, and the second equalizer output 608 are similar to the signal input 512, the equalizer output 510, the first equalizer output 506, and the second equalizer output 508, respectively, of the passive equalizer 500 of FIG. 5.

The alternative passive equalizer 600 also includes a first signal path 602 and a second signal path 604. Although the first signal path 602 and the second signal path 604 are complementary, the alternative passive equalizer 600 does not include a bridge impedance bridging the first signal path 602 to the second signal path 604, in contrast to the passive equalizer 500, which includes the bridge impedance 514 (FIG. 5) bridging the first signal path 502 to the second signal path 504. The first signal path 602 includes the impedance Z, and the second signal path 604 includes a dual impedance ZB' similar to the impedance Z and dual impedance ZA', respectively, of FIG. 5. Similar to the impedance Z and the dual impedance ZA' of FIG. 5, the impedance Z and the dual impedance ZB' of FIG. 6 are second order impedance networks. It should be noted, however, that the impedance Z and the dual impedance ZB' may instead be implemented as first, third, fourth, or any other order impedance networks. Also, the impedance Z of FIG. 6 includes the first resistor R1 in parallel with the series combination of the capacitor C1 and the inductor L1, and the dual impedance ZB' includes the parallel combination of the capacitor C2 and the inductor L2 in series with a second resistor R2B. Similar to the first resistor R1 of FIG. 2 and FIG. 5, a value of the first resistor R1 of FIG. 6 may be a reference resistance R0 multiplied by N (R1=R0*N). A value of the second resistor R2B of FIG. 6, however, is N+1 multiplied by the reference resistance R0, which is divided by $$N-1\left(R2B = \frac{(N+1)R0}{N-1}\right),$$

in contrast to the value of the second resistor R2A of FIG. 5, which is $$R2A = \frac{R0}{N-1}.$$

The alternative passive equalizer 600 also includes a resistor R1 (having a value of R1=N*R0) electrically connected from between the parallel combination of the second inductor L2 and the second capacitor C2 and the second resistor R2B to the second equalizer output 608.

In operation, input signal VIN is provided to the signal input 612, and consequently to the first signal path 602 and the second signal path 604. The first signal path 602 provides a first equalizer output signal VAO to the first equalizer output 606 responsive to the input signal VIN. The second signal path 604 provides a second equalizer output signal VBO to the second equalizer output 608 responsive to the input signal VIN. The second equalizer output signal VBO manifests inverse frequency dependent behavior to that of the first equalizer output signal VAO.

With the alternative passive equalizer 600 configured as discussed above, a resistance value of the second resistor R2B may be selected to generally be relatively higher than a resistance value of the second resistor R2A of FIG. 5

$$\left(R2B = \frac{(N+1)R0}{N-1} \text{ vs. } R2A = \frac{R0}{N-1}\right).$$

This is because the resistance value of the second resistor R2B is on the same order of magnitude as the reference resistance value R0 regardless of the value of N (assuming N does not equal 1), even if the value of N is selected to relatively high (e.g., N>3, without limitation). By way of non-limiting example, if N=4, R2B=(5/3)*R0. Also by way of non-limiting example, if N=10, R2B=(11/9)*R0. By contrast, the resistance value of the second resistor R2A of FIG. 5 may be much smaller than that of the reference resistance R0 if N is relatively large. By way of non-limiting example, if N=4, R2A=(1/3)*R0. Also by way of non-limiting example, if N=10, R2A=(1/9)*R0. Implementing a very small resistor on an integrated circuit chip may be relatively difficult because achieving a very small resistance may involve placing several larger resistors in parallel, which consumes a relatively large chip area to implement. Accordingly, an advantage of the alternative passive equalizer 600 over the passive equalizer 500 of FIG. 5 is that chip area may be reduced as compared to that of the passive equalizer 500 due to the resistance value of the second resistor R2B being on the same order of magnitude as the reference resistance R0.

The passive equalizer 500 of FIG. 5, however, is not without its advantages. As a non-limiting example, since the passive equalizer 500 includes a bridge impedance 514 (FIG. 5), the passive equalizer 500 may be balanced (i.e., an output impedance of the passive equalizer 500 may be substantially equal to an input impedance of the passive equalizer 500). The passive equalizer 500 may experience less reflection, as compared to the alternative passive equalizer 600, when providing signals (i.e., first equalizer output signal VAO and the second equalizer output signal VBO) to an amplifier circuit (e.g., the amplifier circuit 404 of FIG. 4, without limitation).

Figure 7:
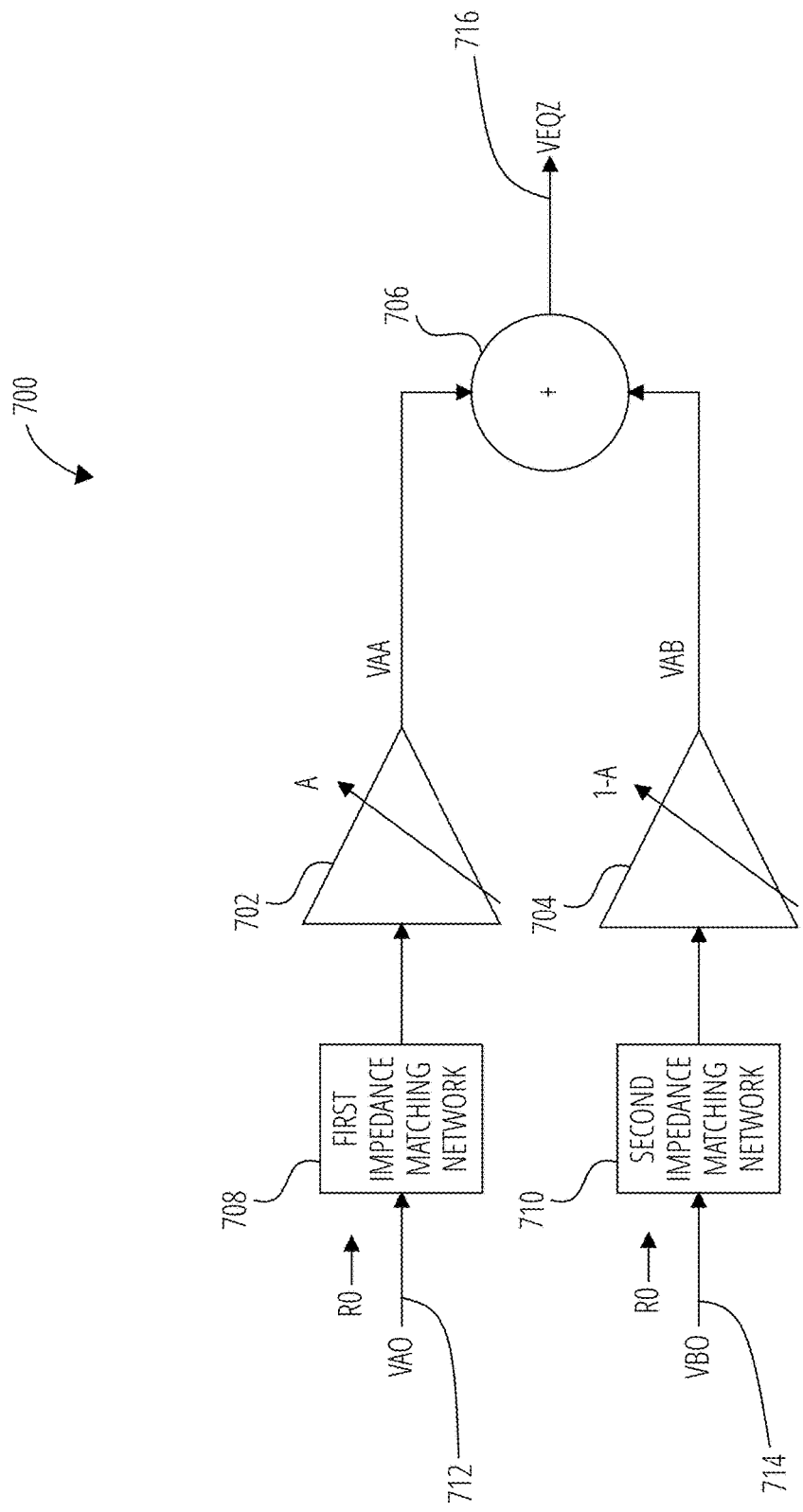
FIG. 7 is a circuit schematic illustration of a programmable amplifier circuit, which may be used in the data receiver of FIG. 4, according to some embodiments.

FIG. 7 is a circuit schematic illustration of a programmable amplifier circuit 700 that may be used for the amplifier circuit 404 of the data receiver 400 of FIG. 4, according to some embodiments. The programmable amplifier circuit 700 may be a more detailed embodiment of the programmable amplifier circuit 404 of FIG. 4. The programmable amplifier circuit 700 includes a first amplifier input 712, a second amplifier input 714, a first impedance matching network 708, a second impedance matching network 710, a first programmable-gain amplifier 702, a second programmable-gain amplifier 704, a summing circuit 706, and an amplifier output 716. The first amplifier input 712 and the second amplifier input 714 are configured to receive a first equalizer output signal VAO and a second equalizer output signal VBO, respectively from a passive equalizer (e.g., the passive equalizer 402 of FIG. 4, the passive equalizer 500 of FIG. 5, the alternative passive equalizer 600 of FIG. 6, without limitation). Accordingly, the first amplifier input 712 and the second amplifier input 714 may be electrically connected to the passive equalizer (e.g., to the first equalizer output 506 and the second equalizer output 508, respectively, of FIG. 5, to the first equalizer output 606 and the second equalizer output 608, respectively, of FIG. 6, without limitation).

The first programmable-gain amplifier 702 and the second programmable-gain amplifier 704 are amplifiers having gains (a gain of A for the first programmable-gain amplifier 702 and a gain of 1-A for the second programmable-gain amplifier 704) that are programmable. By way of non-limiting example, the gains (i.e., the value of A) of the first programmable-gain amplifier 702 and second programmable-gain amplifier 704 may be electrically programmable responsive to control signals from control circuitry (e.g., the control signals 420 from the control circuitry 408 of FIG. 4, without limitation). Control circuitry 408 is operative to change the gains responsive to the frequency of VIN, and information regarding the channel length, so as to provide compensation for the channel.

In some embodiments the first programmable-gain amplifier 702 and the second programmable-gain amplifier 704 may each be implemented using a plurality of amplifiers (e.g., complementary metal oxide semiconductor (CMOS) differential pair amplifiers, without limitation) that are individually controllable to be enabled or disabled. Accordingly, the gains of the first programmable-gain amplifier 702 and the second programmable-gain amplifier 704 may be increased by enabling a larger number of their amplifiers. Likewise, the gains of the first programmable-gain amplifier 702 and the second programmable-gain amplifier 704 may be reduced by disabling a larger number of their amplifiers. In other embodiments the first programmable-gain amplifier 702 and the second programmable-gain amplifier 704 may be implemented using operation amplifier circuits including electrically controllable resistors to adjust the gains of the first programmable-gain amplifier 702 and the second programmable-gain amplifier 704.

An ideal amplifier may be assumed to have infinite input impedance and zero output impedance. In practice, however, all amplifiers have finite input impedance and non-zero output impedance. It follows, then, that in practice the first programmable-gain amplifier 702 and the second programmable-gain amplifier 704 have finite input impedance and non-zero output impedance. As a result, the first impedance matching network 708 and the second impedance matching network 710 are configured to provide an appropriate impedance termination to the passive equalizer electrically connected to the first impedance matching network 708 and the second impedance matching network 710. By way of non-limiting example, the passive equalizer 500 of FIG. 5 and the alternative passive equalizer 600 of FIG. 6 are designed for a termination substantially equal to the reference resistance R0. Accordingly, the first impedance matching network 708 and the second impedance matching network 710 may be configured such that input impedances looking into the first amplifier input 712 and the second amplifier input 714 are substantially equal to the reference resistance R0.

In embodiments where the first programmable-gain amplifier 702 and the second programmable-gain amplifier 704 are implemented using multiple CMOS differential pair amplifiers that are controllably enabled or disabled to adjust the gains of the first programmable-gain amplifier 702 and the second programmable-gain amplifier 704, input impedances of the first programmable-gain amplifier 702 and the second programmable-gain amplifier 704 may have relatively large capacitive components. In such embodiments the first impedance matching network 708 and the second impedance matching network 710 are configured to compensate for these large capacitive components. By way of non-limiting example, the first impedance matching network 708 and the second impedance matching network 710 may include bridged t-coil networks to compensate for the large capacitive components.

The first programmable-gain amplifier 702 and the second programmable-gain amplifier 704 are configured to amplify the first equalizer output signal VAO and the second equalizer output signal VBO, respectively, to generate a first amplified signal VAA and a second amplified signal VAB. More specifically, the first programmable-gain amplifier 702 is configured to amplify the first equalizer output signal VAO by a gain A to generate the first amplified signal VAA. Also, the second programmable-gain amplifier 704 is configured to amplify the second equalizer output signal VBO by the gain 1-A to generate the second amplified signal VAB. In some embodiments where the programmable amplifier circuit 700 is used with the passive equalizer 500 of FIG. 5 or the alternative passive equalizer 600 of FIG. 6 the value of A may be 1/(N+1), where N is the same N discussed above with reference to FIG. 5 and FIG. 6. The first programmable-gain amplifier 702 and the second programmable-gain amplifier 704 are electrically connected to the summing circuit 706. As a result, the first programmable-gain amplifier 702 and the second programmable-gain amplifier 704 are configured to provide the first amplified signal VAA and the second amplified signal VAB to the summing circuit 706.

The summing circuit 706 is configured to receive the first amplified signal VAA and the second amplified signal VAB, and generate an equalized signal VEQZ based on a summation of the first amplified signal VAA and the second amplified signal VAB, which summation is preferably linear. In some embodiments the summing circuit 706 may include a linear summing amplifier (e.g., implemented using an operational amplifier, without limitation). Assuming that the programmable amplifier circuit 700 is used in conjunction with a passive equalizer having the properties discussed above for the passive equalizer 402 of FIG. 4, and assuming that the first impedance matching network 708 and the second impedance matching network 710 provide impedance matching, the equalized signal VEQZ provided at amplifier output 716 has a flat frequency response with respect to the source signal (i.e., the signal injected into the channel, whose output is VIN in FIG. 4, FIG. 5, and FIG. 6).

Figure 8:
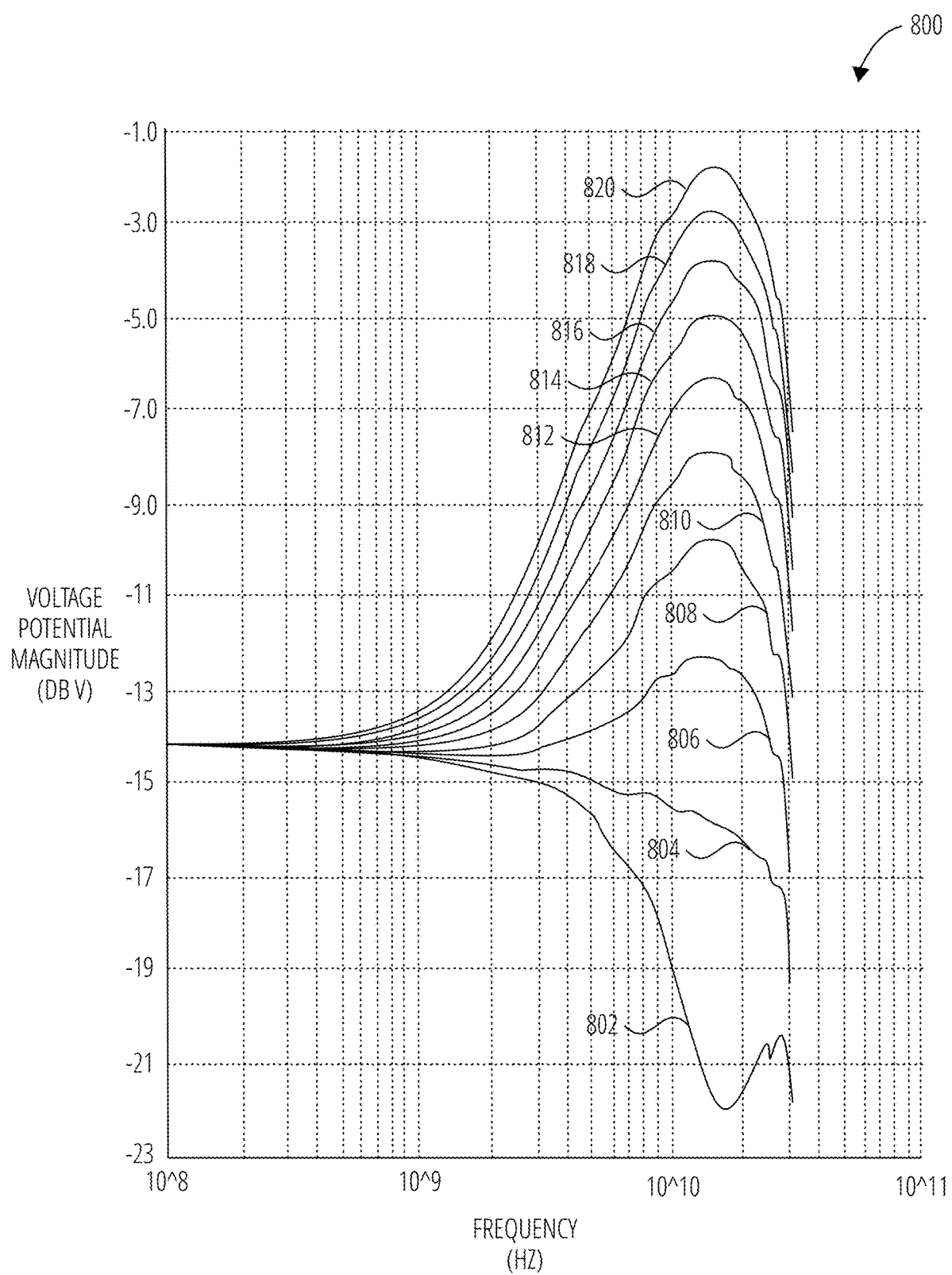
FIG. 8 is a plot 800 illustrating examples of equalized signals from front-end circuitry of FIG. 4 plotted against frequency with a signal input of the front-end circuitry electrically connected to a relatively short physical channel.

FIG. 8 is a plot 800 illustrating examples of equalized signals VEQZ from front-end circuitry 406 of FIG. 4 plotted against frequency with a signal input of the front-end circuitry 406 electrically connected to a relatively short physical channel (e.g., a relatively short conductive trace of an integrated circuit device delivering the input signal VIN to the front-end circuitry 406 from a source signal, without limitation). The equalized signals VEQZ of the plot 800 are shown in decibel volts (dB V). Specifically, the plot 800 includes an A=0.1 curve 802, an A=0.2 curve 804, an A=0.3 curve 806, an A=0.4 curve 808, an A=0.5 curve 810, an A=0.6 curve 812, an A=0.7 curve 814, an A=0.8 curve 816, and A=0.9 curve 818, and an A=1.0 curve 820, where A is the A discussed above with reference to FIG. 4 and FIG. 7 (i.e., the gain of the first amplifier 414 of FIG. 4 or the first programmable-gain amplifier 702 of FIG. 7). A value of N=4 (the N discussed above with reference to FIG. 5 and FIG. 6) of the passive equalizer 402 was used to generate the plot 800.

Upon inspection of the plot 800, the A=0.2 curve 804 may show a flatter frequency response than the A=0.1 curve 802, the A=0.3 curve 806, the A=0.4 curve 808, the A=0.5 curve 810, the A=0.6 curve 812, the A=0.7 curve 814, the A=0.8 curve 816, the A=0.9 curve 818, or the A=1.0 curve 820. Accordingly, where a relatively short physical channel is electrically connected to the signal input of the front-end circuitry 406 (FIG. 4), N=4 and A=0.2 may be appropriate design choices for implementing the front-end circuitry 406. It is noted that for a short physical channel an appropriate relationship between A and N may be given by A=1/(N+1).

Figure 9:
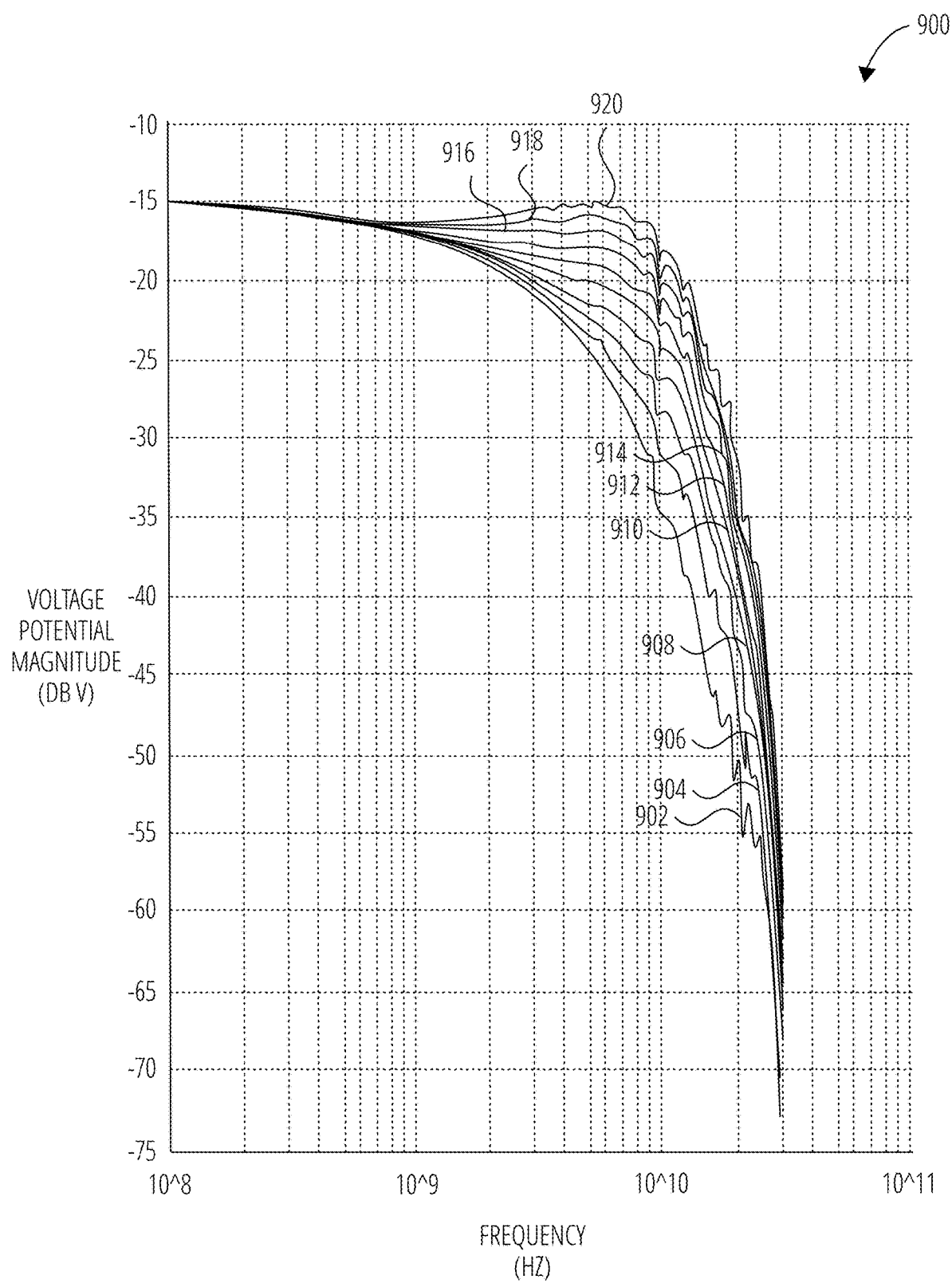
FIG. 9 is a plot illustrating examples of equalized signals from front-end circuitry of FIG. 4 plotted against frequency with a signal input of the front-end circuitry electrically connected to a medium-length physical channel.

FIG. 9 is a plot 900 illustrating examples of equalized signals VEQZ from front-end circuitry 406 of FIG. 4 plotted against frequency with a signal input of the front-end circuitry 406 electrically connected to a medium-length physical channel (e.g., a medium-length conductive trace of an integrated circuit device delivering the input signal VIN to the front-end circuitry 406 from a source signal, without limitation). The equalized signals VEQZ of the plot 800 are shown in dB V. Specifically, the plot 900 includes an A=0.1 curve 902, an A=0.2 curve 904, an A=0.3 curve 906, an A=0.4 curve 908, an A=0.5 curve 910, an A=0.6 curve 912, an A=0.7 curve 914, an A=0.8 curve 916, an A=0.9 curve 918, and an A=1.0 curve 920, where A is the A discussed above with reference to FIG. 4 and FIG. 7 (i.e., the gain of the first amplifier 414 of FIG. 4 or the first programmable-gain amplifier 702 of FIG. 7). Similar to the plot 800 of FIG. 8, a value of N=4 (the N discussed above with reference to FIG. 5 and FIG. 6) of the passive equalizer 402 was used to generate the plot 900.

Upon inspection of the plot 900, the A=0.8 curve 916 may show a flatter frequency response than the A=0.1 curve 902, the A=0.2 curve 904, the A=0.3 curve 906, the A=0.4 curve 908, the A=0.5 curve 910, the A=0.6 curve 912, the A=0.7 curve 914, the A=0.9 curve 918, or the A=1.0 curve 920. Accordingly, where a medium-length physical channel is electrically connected to the signal input of the front-end circuitry 406 (FIG. 4), N=4 and A=0.8 may be appropriate design choices for implementing the front-end circuitry 406. It is noted that in some embodiments values of N, A, or both may be selected based at least in part on a length of the channel electrically connected to the signal input of the front-end circuitry 406.

Figure 10:
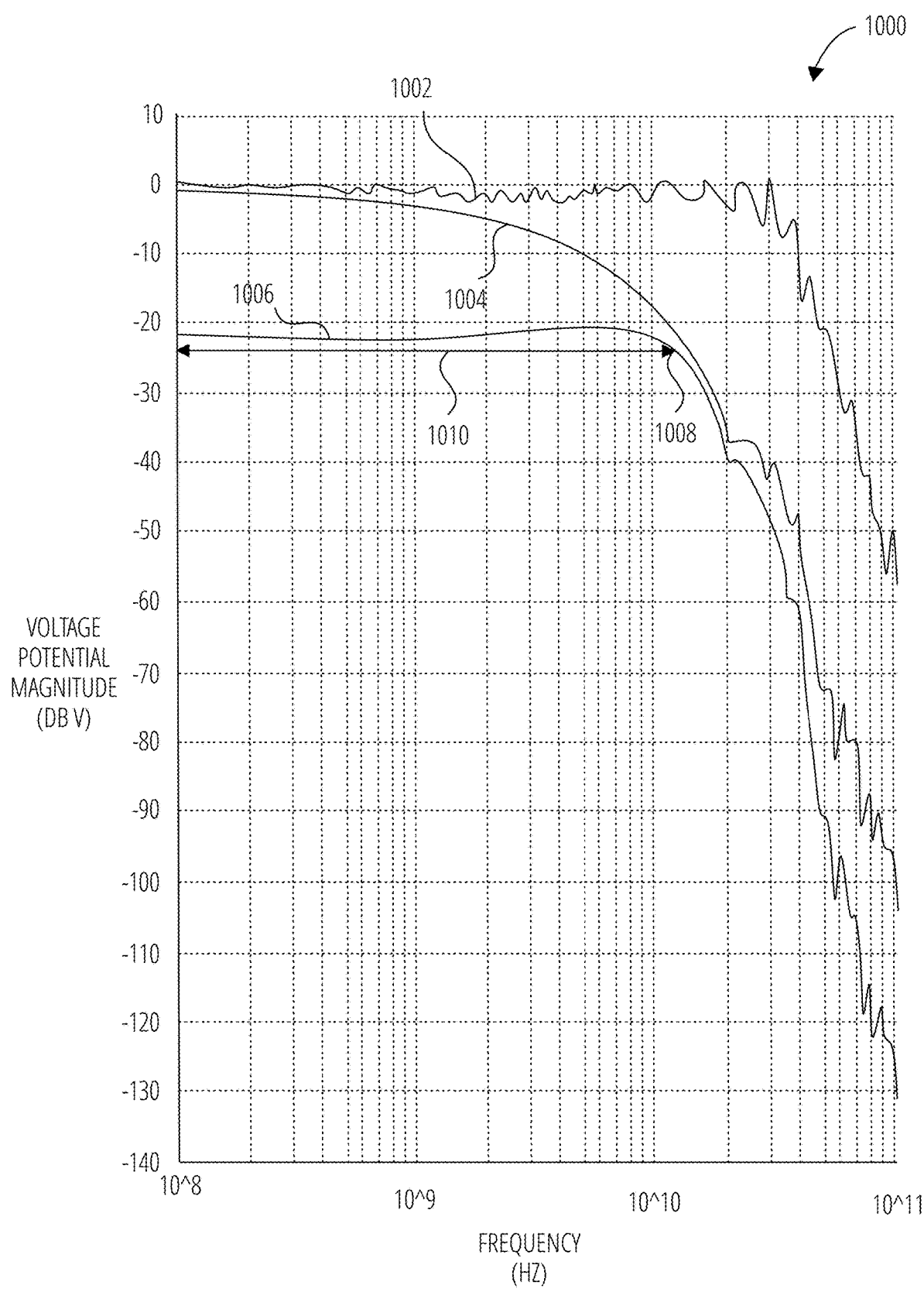
FIG. 10 is a plot illustrating examples of a channel input signal curve, a channel output signal curve, and an equalized signal curve.

FIG. 10 is a plot 1000 illustrating examples of a channel input signal curve 1002, a channel output signal curve 1004, and an equalized signal VEQZ curve 1006. The channel input signal curve 1002 is a signal at an input to a physical channel (e.g., a conductive trace, without limitation) having its output electrically connected to a signal input of the front-end circuitry 406 of FIG. 4. The channel output signal curve 1004 is a signal at the output of the physical channel responsive to the channel input signal curve 1002 being applied to the physical channel, or in other words the channel output signal curve 1004 is the input signal VIN (FIG. 4) at the signal input of the front-end circuitry 406. The equalized signal VEQZ curve 1006 is the equalized signal VEQZ taken from the output of the front-end circuitry 406 responsive to the channel output signal curve 1004 applied to the signal input of the front-end circuitry 406.

As is apparent from the channel input signal curve 1002 and the channel output signal curve 1004, the physical channel attenuates the signal applied to its input, and that attenuation generally increases with frequency. Although the channel output signal curve 1004 steadily decreases with frequency, the equalized signal VEQZ curve 1006 demonstrates a substantially flat response through a passband 1010 ending at a cutoff frequency 1008 (at −3 dB attenuation) of substantially 12.8 GHz.

Figure 11:
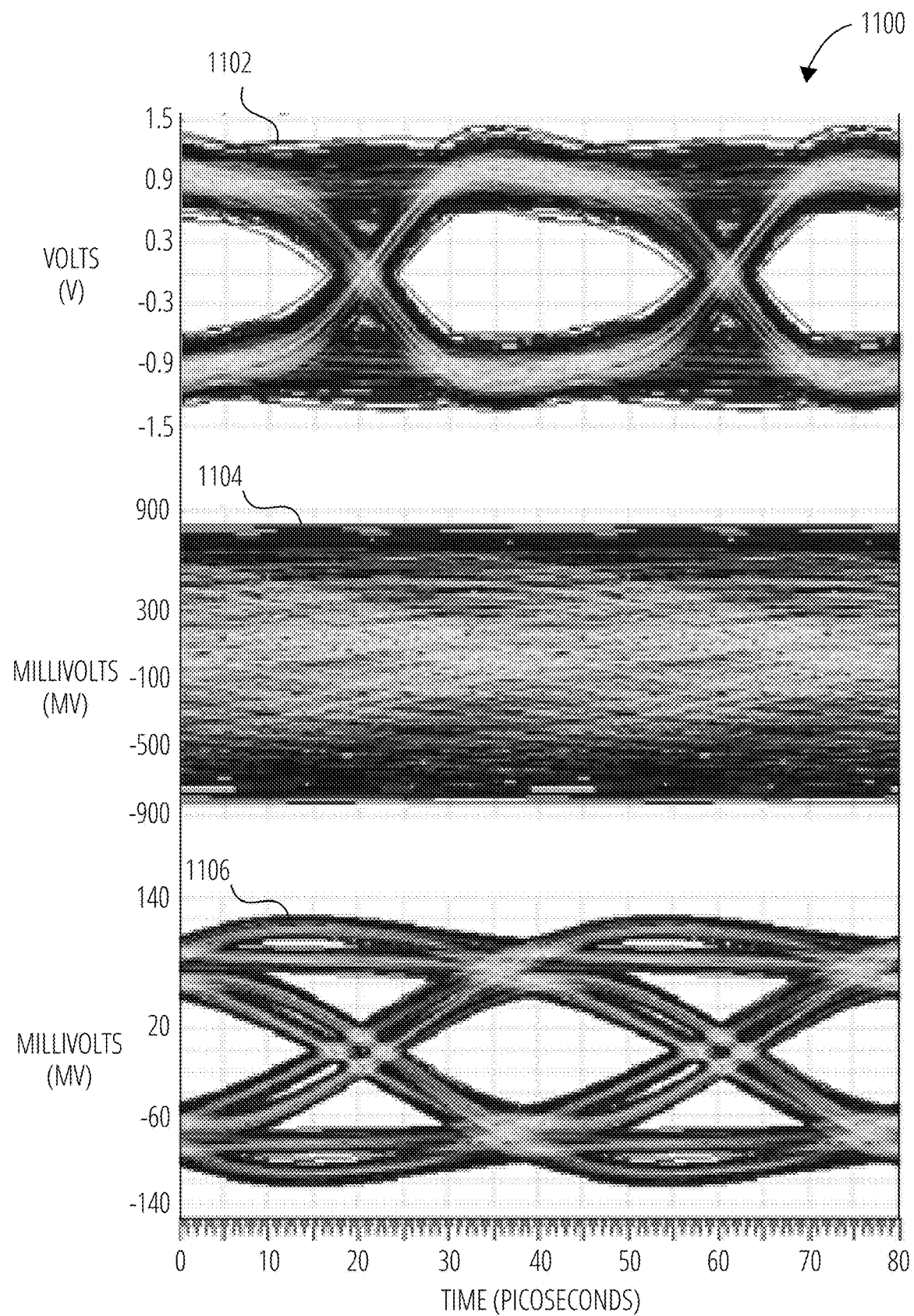
FIG. 11 illustrates eye diagram plots corresponding to the channel input signal curve, the channel output signal curve, and the equalized signal curve of FIG. 10.

FIG. 11 illustrates eye diagram plots 1100 corresponding to the channel input signal curve 1002, the channel output signal curve 1004, and the equalized signal VEQZ curve 1006 of FIG. 10. Specifically, the eye diagram plots 1100 include a channel input signal eye diagram 1102, a channel output signal eye diagram 1104, and an equalized signal VEQZ eye diagram 1106. As may be seen in the eye diagram plots 1100, whatever opening exists in the channel input signal eye diagram 1102 is closed in the channel output signal eye diagram 1104. As also seen in the eye diagram plots 1100, the eye is opened in equalized signal VEQZ eye diagram 1106. Accordingly, even if an input signal VIN (FIG. 4) delivered to front-end circuitry 406 (FIG. 4) has a closed eye due to the physical channel, the front-end circuitry 406 still provides an equalized signal VEQZ (FIG. 4) with an open eye.

Figure 12:
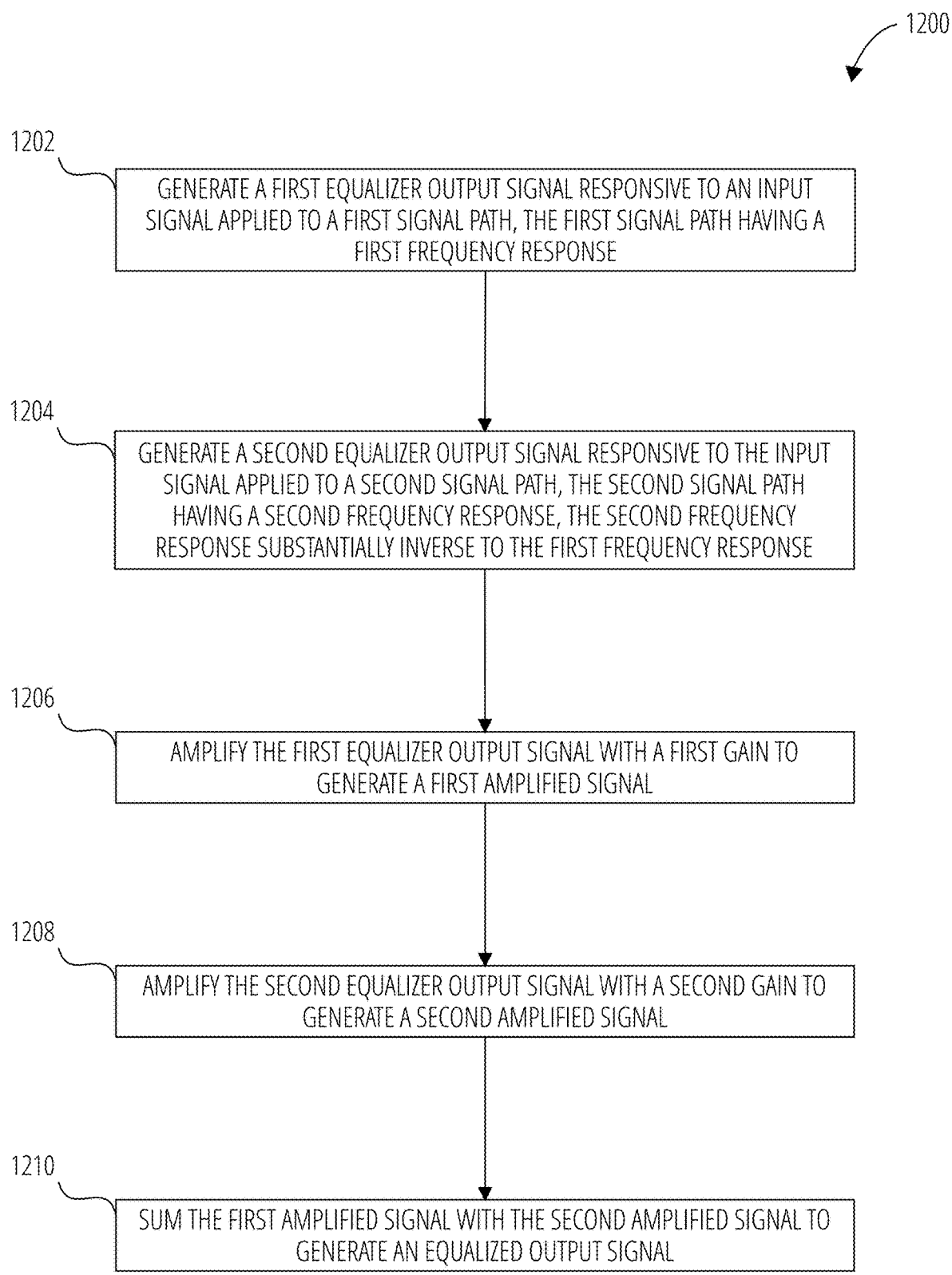
FIG. 12 is a flowchart illustrating a method of equalizing an input signal using the front-end circuitry of FIG. 4, according to some embodiments.

FIG. 12 is a flowchart illustrating a method 1200 of equalizing an input signal using the front-end circuitry 406 of FIG. 4, according to some embodiments. In operation 1202, method 1200 generates a first equalizer output signal responsive to the input signal applied to a first signal path. The first signal path has a first frequency response. In operation 1204, method 1200 generates a second equalizer output signal responsive to the input signal applied to a second signal path. The second signal path has a second frequency response. The second frequency response is substantially inverse to the first frequency response. In operation 1206, method 1200 amplifies the first equalizer output signal with a first gain to generate a first amplified signal. In operation 1208, method 1200 amplifies the second equalizer output signal with a second gain to generate a second amplified signal. In operation 1210, method 1200 sums the first amplified signal with the second amplified signal to generate an equalized output signal.

EXAMPLES

A non-exhaustive, non-limiting list of example embodiments follows. Not each of the example embodiments listed below is explicitly and individually indicated as being combinable with all others of the example embodiments listed below and embodiments discussed above. It is intended, however, that these example embodiments are combinable with all other example embodiments and embodiments discussed above unless it would be apparent to one of ordinary skill in the art that the embodiments are not combinable.

Example 1: A passive equalizer, comprising: a signal input; an equalizer output including a first equalizer output and a second equalizer output; a first signal path between the signal input and the first equalizer output, the first signal path having a first frequency response responsive to an input signal provided to the signal input; and a second signal path between the signal input and the second equalizer output, the second signal path having a second frequency response responsive to the input signal provided to the signal input, the second frequency response exhibiting substantially inverse behavior to that of the first frequency response.

Example 2: The passive equalizer of Example 1, wherein the first signal path and the second signal path form respective portions of a Zobel network.

Example 3: The passive equalizer of Example 2, wherein the Zobel network is implemented as a balanced Zobel network.

Example 4: The passive equalizer according to any one of Examples 1-3, wherein the first signal path and the second signal path include second order impedance networks.

Example 5: The passive equalizer according to any one of Examples 1-4, further comprising a bridge impedance bridging the first signal path with the second signal path.

Example 6: The passive equalizer according to any one of Examples 1-4, wherein the first signal path and the second signal path are substantially free of bridging elements that bridge the first signal path and the second signal path.

Example 7: The passive equalizer according to any one of Examples 1-6, wherein: the first signal path includes a first impedance network comprising a first resistor in parallel with a series combination of a first capacitor with a first inductor; and the second signal path includes a parallel combination of a second capacitor with a second inductor, the parallel combination of the second capacitor with the second inductor in series with a second resistor.

Example 8: The passive equalizer according to any one of Examples 1-7, wherein: the first equalizer output is configured to provide a first equalizer output signal to a programmable amplifier circuit; the second equalizer output is configured to provide a second equalizer output signal to the programmable amplifier circuit; and the programmable amplifier circuit is configured to amplify and sum the first equalizer output signal and the second equalizer output signal to provide an equalized output signal.

Example 9: Front-end circuitry for a data receiver, the front-end circuitry comprising: a passive equalizer configured to receive an input signal, the passive equalizer including a first signal path and a second signal path, an impedance of the first signal path and an impedance of the second signal path dual to each other, the first signal path configured to provide a first equalizer output signal responsive to the received input signal, the second signal path configured to provide a second equalizer output signal responsive to the received input signal; and a programmable amplifier circuit configured to receive the first equalizer output signal and the second equalizer output signal from the passive equalizer, the programmable amplifier circuit comprising: a first programmable-gain amplifier configured to amplify the first equalizer output signal with a first gain to provide a first amplified signal; a second programmable-gain amplifier configured to amplify the second equalizer output signal with a second gain to provide a second amplified signal; and a summing circuit configured to add the first amplified signal and the second amplified signal to provide an equalized output signal.

Example 10: The front-end circuitry of Example 9, wherein the second gain is equal to a difference between one and the first gain.

Example 11: The front-end circuitry according to any one of Examples 9 and 10, wherein the programmable amplifier circuit further comprises: a first impedance matching network configured to terminate the first signal path; and a second impedance matching network configured to terminate the second signal path.

Example 12: The front-end circuitry according to any one of Examples 9-11, further comprising a control circuitry configured to provide control signals to the programmable amplifier circuit to control the first gain and the second gain.

Example 13: The front-end circuitry according to any one of Examples 9-12 wherein the programmable amplifier circuit comprises a programmable-gain summing amplifier.

Example 14: The front-end circuitry according to any one of Examples 9-13, wherein the summing circuit comprises a linear summing amplifier.

Example 15: The front-end circuitry according to any one of Examples 9-14, wherein at least one of the first programmable-gain amplifier and the second programmable-gain amplifier includes amplifier slices, each amplifier slice including a differential pair amplifier, gain adjustment of the at least one of the first programmable-gain amplifier and the second programmable-gain amplifier achieved by selectively turning the amplifier slices on or off.

Example 16: A data receiver comprising front-end circuitry, the front end circuitry comprising: a passive equalizer configured to receive an input signal, the passive equalizer including a first signal path and a second signal path, an impedance of the first signal path and an impedance of the second signal path dual to each other, the first signal path configured to provide a first equalizer output signal responsive to the received input signal, the second signal path configured to provide a second equalizer output signal responsive to the received input signal; and a programmable amplifier circuit configured to receive the first equalizer output signal and the second equalizer output signal from the passive equalizer, the programmable amplifier circuit comprising: a first programmable-gain amplifier configured to amplify the first equalizer output signal with a first gain to provide a first amplified signal; a second programmable-gain amplifier configured to amplify the second equalizer output signal with a second gain to provide a second amplified signal; and a summing circuit configured to add the first amplified signal and the second amplified signal to provide an equalized output signal.

Example 17: The data receiver of Example 16, wherein the data receiver is implemented as a serializer/deserializer.

Example 18: The data receiver according to any one of Examples 16 and 17, further comprising control circuitry configured to control the first gain of the first programmable-gain amplifier and the second gain of the second programmable-gain amplifier.

Example 19: A method of equalizing an input signal, the method comprising: generating a first equalizer output signal responsive to the input signal applied to a first signal path, the first signal path having a first frequency response; generating a second equalizer output signal responsive to the input signal applied to a second signal path, the second signal path having a second frequency response, the second frequency response substantially inverse to the first frequency response; amplifying the first equalizer output signal with a first gain to generate a first amplified signal; amplifying the second equalizer output signal with a second gain to generate a second amplified signal; and summing the first amplified signal with the second amplified signal to generate an equalized output signal.

Example 20: The method of Example 19, wherein generating the first equalizer output signal responsive to the input signal applied to the first signal path and generating the second equalizer output signal responsive to the input signal applied to the second signal path comprise applying the input signal to second-order impedance networks.

Example 21: The method according to any one of Examples 19 and 20, wherein generating the second equalizer output signal responsive to the input signal applied to the second signal path comprises generating the second equalizer output signal responsive to the input signal applied to a second impedance that is dual to a first impedance of the first signal path.

Example 22: The method according to any one of Examples 19-21, wherein amplifying the second equalizer output signal with the second gain comprises amplifying the second equalizer output signal with the second gain of one minus the first gain.

Example 23: The method according to any one of Examples 19-22, wherein: amplifying the first equalizer output signal comprises applying the first equalizer output signal to a first programmable-gain amplifier; and amplifying the second equalizer output signal comprises applying the second equalizer output signal to a second programmable-gain amplifier.

CONCLUSION

As used in the present disclosure, the terms "module" or "component" may refer to specific hardware implementations configured to perform the actions of the module or component and/or software objects or software routines that may be stored on and/or executed by general purpose hardware (e.g., computer-readable media, processing devices, without limitation) of the computing system. In some embodiments, the different components, modules, engines, and services described in the present disclosure may be implemented as objects or processes that execute on the computing system (e.g., as separate threads, without limitation). While some of the system and methods described in the present disclosure are generally described as being implemented in software (stored on and/or executed by general purpose hardware), specific hardware implementations or a combination of software and specific hardware implementations are also possible and contemplated.

As used in the present disclosure, the term "combination" with reference to a plurality of elements may include a combination of all the elements or any of various different subcombinations of some of the elements. For example, the phrase "A, B, C, D, or combinations thereof" may refer to any one of A, B, C, or D; the combination of each of A, B, C, and D; and any subcombination of A, B, C, or D such as A, B, and C; A, B, and D; A, C, and D; B, C, and D; A and B; A and C; A and D; B and C; B and D; or C and D.

Terms used in the present disclosure and especially in the appended claims (e.g., bodies of the appended claims, without limitation) are generally intended as "open" terms (e.g., the term "including" should be interpreted as "including, but not limited to," the term "having" should be interpreted as "having at least," the term "includes" should be interpreted as "includes, but is not limited to," without limitation).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more," without limitation); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations, without limitation). Furthermore, in those instances where a convention analogous to "at least one of A, B, and C, etc." or "one or more of A, B, and C, etc.," is used, in general such a construction is intended to include A alone, B alone, C alone, A and B together, A and C together, B and C together, or A, B, and C together, etc.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

While the present disclosure has been described herein with respect to certain illustrated embodiments, those of ordinary skill in the art will recognize and appreciate that the present invention is not so limited. Rather, many additions, deletions, and modifications to the illustrated and described embodiments may be made without departing from the scope of the invention as hereinafter claimed along with their legal equivalents. In addition, features from one embodiment may be combined with features of another embodiment while still being encompassed within the scope of the invention as contemplated by the inventor.

What is claimed is:

1. An apparatus, comprising:
    a first signal path between a signal input terminal and a first equalizer output terminal, the first signal path having a first frequency response responsive to an input signal provided to the signal input terminal; and
    a second signal path between the signal input terminal and a second equalizer output terminal, the second signal path having a second frequency response responsive to the input signal provided to the signal input terminal, the second frequency response exhibiting substantially inverse behavior to that of the first frequency response.

2. The apparatus of claim 1, wherein a second impedance of the second signal path is substantially a square of a reference impedance divided by a first impedance of the first signal path.

3. The apparatus of claim 1, comprising an amplifier circuit including:
    a first amplifier electrically connected to the first equalizer output terminal; and
    a second amplifier electrically connected to the second equalizer output terminal.

4. The apparatus of claim 3, comprising a summing circuit electrically connected to output terminals of the first amplifier and the second amplifier.

5. The apparatus of claim 3, wherein a gain of the second amplifier is selected as a function of a gain of the fist amplifier.

6. The apparatus of claim 3, wherein a gain of the second amplifier is one minus a gain of the first amplifier.

7. The apparatus of claim 3, comprising control circuitry to control a gain of the first amplifier and a gain of the second amplifier.

8. The apparatus of claim 3, wherein the first amplifier and the second amplifier are programmable-gain amplifiers.

9. The apparatus of claim 3, comprising:
- a first impedance matching network between the first equalizer output terminal and the first amplifier; and
- a second impedance matching network between the second equalizer output terminal and the second amplifier.

10. The apparatus of claim 1, wherein a first impedance of the first signal path and a second impedance of the second signal path are second order impedance networks.

11. The apparatus of claim 1, comprising a bridge impedance bridging the first signal path to the second signal path.

12. The apparatus of claim 1, wherein the first signal path and the second signal path are free of a bridge impedance to bridge the first signal path to the second signal path.

13. A method of equalizing an input signal, the method comprising:
- generating a first equalizer output signal responsive to the input signal applied to a first signal path, the first signal path having a first impedance; and
- generating a second equalizer output signal responsive to the input signal applied to a second signal path, the second signal path having a second impedance, the second impedance substantially a square of a reference impedance divided by the first impedance.

14. The method of claim 13, comprising:
- amplifying the first output signal with a first gain to generate a first amplified signal; and
- amplifying the second output signal with a second gain to generate a second amplified signal.

15. The method of claim 14, comprising summing the first amplified signal with the second amplified signal to generate an equalized output signal.

16. The method of claim 15, wherein a frequency of the equalized output signal is greater than or equal to ten gigahertz (10 GHz).

17. The method of claim 15, wherein a frequency of the equalized output signal is substantially 12.8 gigahertz (GHz).

18. An apparatus, comprising:
- a first signal path between a signal input terminal and a first equalizer output terminal, the first signal path having a first frequency response responsive to an input signal provided to the signal input terminal;
- a second signal path between the signal input terminal and a second equalizer output terminal, the second signal path having a second frequency response responsive to the input signal provided to the signal input terminal, the second frequency response exhibiting substantially inverse behavior to that of the first frequency response over a predetermined passband, and
- a variable-gain amplifier to sum amplified versions of a first equalizer output signal from the first equalizer output terminal and a second equalizer output signal from the second equalizer output terminal to generate an equalized output signal.

19. The apparatus of claim 18, wherein a frequency response of the equalized output signal is substantially flat through the predetermined passband.

20. The apparatus of claim 19, wherein the predetermined passband extends at least to ten gigahertz (10 GHz).

* * * * *